United States Patent
Lee et al.

(10) Patent No.: US 12,514,120 B2
(45) Date of Patent: Dec. 30, 2025

(54) POWER MANAGEMENT INTEGRATED CIRCUIT FOR HARVESTING ENERGY AND ENERGY HARVESTING SYSTEM INCLUDING THE SAME

(71) Applicant: KOREA ADVANCED INSTITUTE OF SCIENCE AND TECHNOLOGY, Daejeon (KR)

(72) Inventors: Sang-Gug Lee, Daejeon (KR); Young-Seok Noh, Daejeon (KR); Jeong-Il Seo, Daejeon (KR); Won-Jong Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 919 days.

(21) Appl. No.: 17/729,756

(22) Filed: Apr. 26, 2022

(65) Prior Publication Data

US 2023/0029579 A1   Feb. 2, 2023

(30) Foreign Application Priority Data

Jul. 27, 2021  (KR) .......... 10-2021-0098215
Sep. 27, 2021  (KR) .......... 10-2021-0127479

(51) Int. Cl.
 *H10N 10/10*   (2023.01)
 *H02J 7/00*   (2006.01)

(52) U.S. Cl.
 CPC .......... *H10N 10/10* (2023.02); *H02J 7/0042* (2013.01); *H02J 7/0063* (2013.01); *H02J 7/00712* (2020.01); *H02J 2207/20* (2020.01)

(58) Field of Classification Search
 CPC .... H10N 10/10; H02J 7/00712; H02J 7/0042; H02J 7/0063; H02J 2207/20
 See application file for complete search history.

(56) References Cited

U.S. PATENT DOCUMENTS

| | | | |
|---|---|---|---|
| 9,923,453 B1 * | 3/2018 | Lee ................ | H02M 1/36 |
| 2015/0214835 A1 * | 7/2015 | Shao .............. | H02M 3/158 |
| | | | 323/234 |

FOREIGN PATENT DOCUMENTS

| | | |
|---|---|---|
| KR | 10 2018 0077756 | 7/2018 |
| KR | 10 1904986 | 10/2018 |
| KR | 10 2020 0089805 | 7/2020 |

OTHER PUBLICATIONS

Noh et al., "A Reconfigurable DC-DC Converter for Maximum TEG Energy Harvesting in a Battery-Powered Wireless Sensor Node", 2021 IEEE International Solid-State Circuits Conference, Feb. 17, 2021.

* cited by examiner

*Primary Examiner* — Carlos Amaya
(74) *Attorney, Agent, or Firm* — Womble Bond Dickinson (US) LLP

(57) ABSTRACT

A power management integrated circuit includes a reconfigurable converter connected to a rechargeable battery and a control circuit. The reconfigurable converter includes an inductor to accumulate energy based on an input voltage from a thermoelectric device, provides a wireless sensor node connected to an output node with an output voltage based on the input voltage and an internal input voltage of the rechargeable battery, operates in one of operation modes based on an available power provided from the thermoelectric device and a power consumption by the wireless sensor node and drives the wireless sensor node in response to the wireless sensor node consuming a current greater than a maximum current generated by the thermoelectric device. The control circuit to control the reconfigurable converter based on the input voltage, a first voltage of a first switching node, a second voltage of a second switching node and the output voltage.

16 Claims, 19 Drawing Sheets

POWER MANAGEMENT INTEGRATED CIRCUIT FOR HARVESTING ENERGY AND ENERGY HARVESTING SYSTEM INCLUDING THE SAME

CROSS REFERENCE TO RELATED APPLICATION

This application claims the benefit of priority under 35 USC § 119 to Korean Patent Application No. 10-2021-0098215, filed on Jul. 27, 2021 and to Korean Patent Application No. 10-2021-0127479, filed on Sep. 27, 2021, in the Korean Intellectual Property Office, the disclosure of each of which is incorporated by reference in its entirety herein.

BACKGROUND

1. Field

Example embodiments of the inventive concept relate to energy harvesting. More particularly, example embodiments of the inventive concept relate to a power management integrated circuit (PMIC) for harvesting energy and an energy harvesting system including the same.

2. Discussion of Related Art

Energy harvesting refers to a technology that collects the energy from natural energy sources and turns it into electrical energy. For example, solar power generation is a typical energy harvesting technology. Thermoelectric energy harvesting produces electrical energy using the thermoelectric effect, in which a temperature difference of an object is converted to a potential difference or a potential difference is converted to a temperature difference. A typical application area is the healthcare field, and it is possible to operate various body sensors and communication equipments attached to a body by using an energy generated through the temperature difference between a body temperature and an air temperature. An element that generates electric energy using the thermoelectric effect is called a thermoelectric element (or thermoelectric device). Thermoelectric energy harvesting technique must be capable of harvesting electrical energy with a sufficiently high potential (e.g., above about 1 V) even when the temperature difference of the thermoelectric element is small (e.g., $\Delta T<10°$ C.). Since an output voltage of the thermoelectric element may not exceed 100 mV at a small temperature difference, a power management integrated circuit (PMIC) capable of starting up only with a low output voltage of the thermoelectric element is required.

The thermoelectric element used in the thermoelectric energy harvesting system has a very low output voltage as well as a low output power (e.g., less than 1 mW). Therefore, in order to drive healthcare devices or the like using energy harvested from the thermoelectric element, the efficiency of the power management device between the thermoelectric element and the healthcare apparatus should be high.

FIG. 1 is a block diagram illustrating an example of a thermoelectric energy harvesting system in the prior art.

Referring to FIG. 1, a thermoelectric energy harvesting system 5 in the prior art may include an energy harvester 10, a power management device 20, and at least one healthcare device 30.

The power management device 20 in the thermoelectric energy harvesting system 5 includes a startup circuit 22 for starting up the power management device 20 from a low input voltage VIN and a boost converter 24 for providing a high power output voltage VOUT converted from the input voltage VIN to a load (e.g., the healthcare device 30). The startup circuit 22 starts generating a driving voltage VDD that can drive the boost converter 24 when the input voltage VIN exceeds a predetermined self-startup voltage. The boost converter 24 is driven by a power generated from the startup circuit 22 and boosts the input voltage VIN to the output voltage VOUT greater than the input voltage VIN. As described above, since the input voltage VIN has a very low voltage level, it requires a low self-startup voltage that can start up at the low input voltage VIN and requires the boost converter 24 having a high efficiency even at the low input voltage VIN to supply sufficient power to the load. That is, the thermoelectric energy harvesting system 5 requires a power management device using the self-startup voltage and having higher output efficiency, while being manufactured from a combination of the startup circuit 22 and the boost converter 24 at a lower bill of material (BOM).

SUMMARY

Example embodiments provide a power management integrated circuit capable of balancing harvested energy based on load condition and storing surplus energy in a rechargeable battery.

Example embodiments provide an energy harvesting system capable of balancing harvested energy based on load condition and storing surplus energy in a rechargeable battery.

According to example embodiments, a power management integrated circuit for harvesting energy includes a reconfigurable converter connected to a rechargeable battery and a control circuit. The reconfigurable converter includes an inductor to accumulate energy based on an input voltage applied to an input node from a thermoelectric device, provides a wireless sensor node connected to an output node with an output voltage based on the input voltage and an internal input voltage of the rechargeable battery, operates in one of a plurality of operation modes based on an available power provided from the thermoelectric device and a power consumption by the wireless sensor node and drives the wireless sensor node in response to the wireless sensor node consuming a current greater than a maximum current generated by the thermoelectric device. The control circuit applies a plurality of driving control signals and a plurality of switching control signals to the reconfigurable converter to control the PMIC based on the input voltage, a first voltage of a first switching node, a second voltage of a second switching node and the output voltage. The first switching node is connected to a first terminal of the inductor and the second switching node is connected to a second terminal of the inductor.

According to example embodiments, an energy harvesting system includes an energy harvester, a power management integrated circuit (PMIC), and a wireless sensor node. The energy harvester harvests energy generated in an energy source to generate an input voltage. The PMIC receives the input voltage through an input node and includes an inductor to accumulate energy based on the input voltage and a rechargeable battery. The PMIC generates an output voltage based on the input voltage and selectively based on an internal input voltage of the rechargeable battery and provides the output voltage to an output node. The wireless sensor node is connected to an output node and operates based on the output voltage. The PMIC operates in one of a plurality of operation modes based on an available power provided from the energy harvester and a power consumption by the wireless sensor node, harvests the energy from the energy harvester to a maximum current generated by the energy harvester and drives the drive the wireless sensor node in response to the wireless sensor node consuming a current greater than a maximum current generated by the energy harvester. The wireless sensor node includes a transceiver that operates in a duty cycling mode, and the transceiver is connected to the PMIC when the transceiver transmits/receives data to/from an outside in the duty cycling mode.

According to example embodiments, an energy harvesting system includes an energy harvester, a power management integrated circuit (PMIC), and a wireless sensor node. The energy harvester harvests energy generated in an energy source to generate an input voltage. The PMIC receives the input voltage through an input node and includes an inductor to accumulate energy based on the input voltage, a rechargeable battery, a single-input dual-output (SIDO) boost converter and a buck converter that share the inductor. The PMIC generates an output voltage based on the input voltage and selectively based on an internal input voltage of the rechargeable battery and provides the output voltage to an output node. The wireless sensor node is connected to an output node and operates based on the output voltage. The PMIC operates operates in one of a plurality of operation modes based on an available power provided from the thermoelectric device and a power consumption by the wireless sensor node and harvests the energy from the energy harvester to a maximum current generated by the energy harvester. The wireless sensor node includes a transceiver that operates in a duty cycling mode, and the transceiver is connected to the PMIC when the transceiver transmits/receives data to/from an outside in the duty cycling mode.

Therefore, the PMIC for harvesting energy and the energy harvesting system, harvests energy using the thermoelectric device while the thermoelectric device generates energy and drives the wireless sensor node using the rechargeable battery while the thermoelectric device consumes energy. Therefore, the PMIC may reduce power consumption of the rechargeable battery and increase driving time of the wireless sensor node.

BRIEF DESCRIPTION OF THE DRAWINGS

Example embodiments can be understood in more detail from the following description taken in conjunction with the accompanying drawings, in which.

DETAILED DESCRIPTION OF EMBODIMENTS

Figure 1:
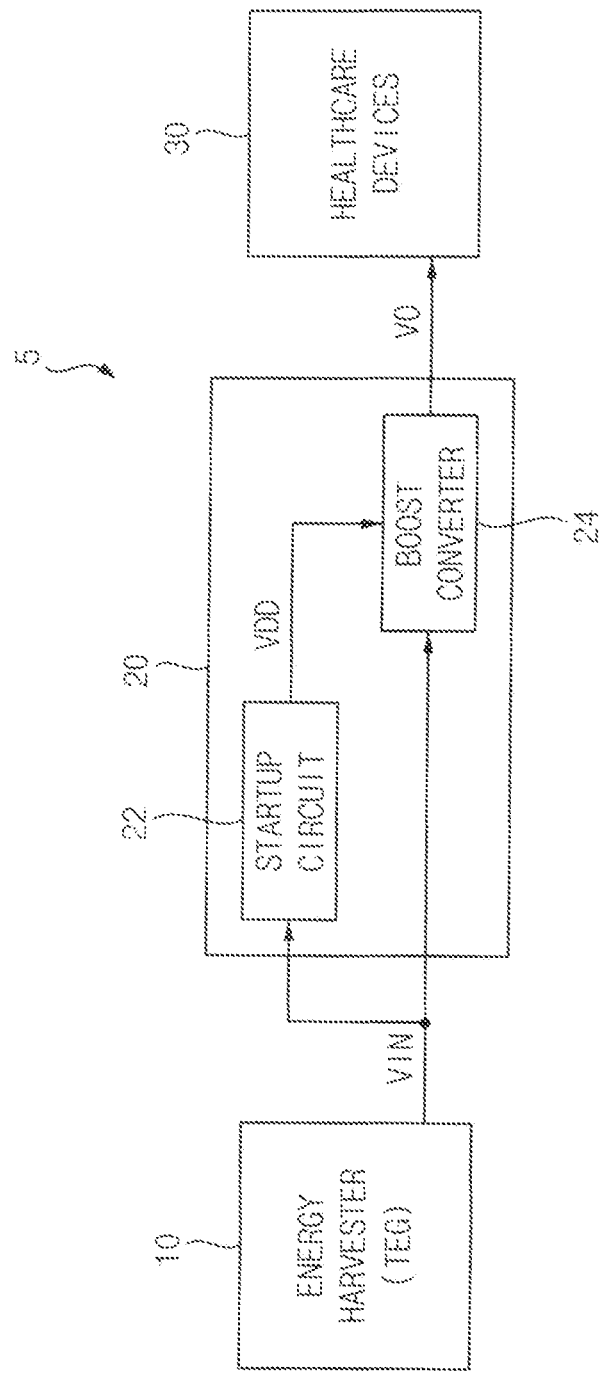
FIG. 1 is a block diagram illustrating an example of a thermoelectric energy harvesting system in the prior art.

It will be understood that, although the terms first, second, third etc. may be used herein to describe various elements, components, and/or sections, these elements, components, and/or sections should not be limited by these terms. These terms are only used to distinguish one element, component, or section from another element, component, or section. Thus, a first element, component, or section discussed below could be termed a second element, component, or section without departing from the teachings of example embodiments.

It will be understood that when an element or layer is referred to as being "connected to" or "coupled to" another element, it can be directly on, connected or coupled to the other element or intervening elements or layers may be present. In contrast, when an element is referred to as being "directly on," "directly connected to" or "directly coupled to" another element, there are no intervening elements present. Like or similar reference numerals refer to like or similar elements throughout. As used herein, the term "and/or" includes any and all combinations of one or more of the associated listed items.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises", "includes", "including", and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments will be described more fully hereinafter with reference to the accompanying drawings, in which various embodiments are shown.

A thermoelectric device may generate a voltage and a power based on a body heat generated by a temperature difference between a hot side attached to a body and a cold side contacted to the air, which is referred to as seeback effect. When the thermoelectric device is coupled to a battery, a current greater than a maximum current capability of the thermoelectric device may flow and the thermoelectric device may generate heat or absorb the heat according to a direction of the current, which is referred to as Peltier effect. A cooling seat in a car uses the Peltier effect. The seeback effect and the Peltier effect may both exist in the thermoelectric device. Because the thermoelectric device consumes the energy instead of generating energy in the Peltier effect, the thermoelectric device may harvest energy when the seeback effect is dominant.

Figure 2:
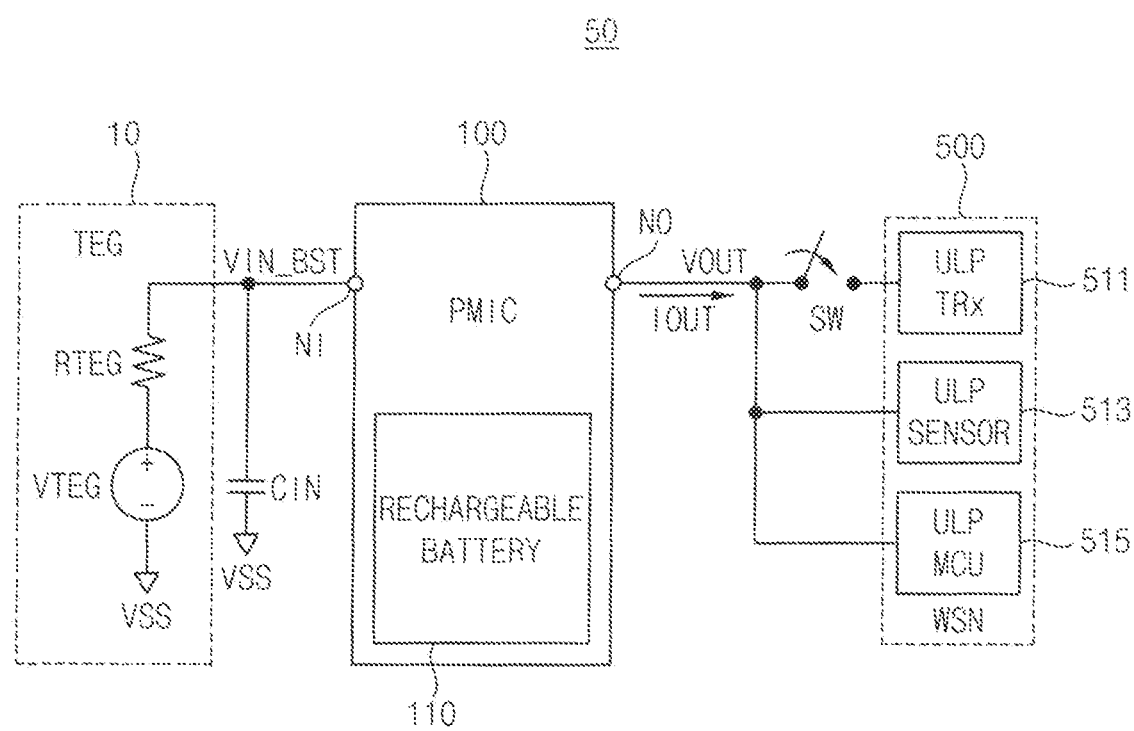
FIG. 2 is a block diagram of an energy harvesting system according to example embodiments.

FIG. 2 is a block diagram of an energy harvesting system according to example embodiments.

Referring to FIG. 2, an energy harvesting system 50 may include an energy harvester 10, a power management integrated circuit (PMIC) 100 including a rechargeable battery 110 and a wireless sensor node (WSN) 500. The energy harvester 10 may be implemented with a thermoelectric device and may be referred to as a thermoelectric generator (TEG). The WSN 500 may be referred to as a load. An input capacitor CIN may be coupled between an input node NI and a ground voltage VSS in parallel with the energy harvester 10.

The PMIC 100 may be connected to the energy harvester 10 at the input node NI and may be connected to the WSN 500 at an output node NO.

The energy harvester 10 may harvest energy generated in a peripheral energy source to generate an input voltage VIN_BST. The energy harvester 10 may include a direct current (DC) voltage source VTEG coupled to the ground voltage VSS and a resistor RTEG connected to the DC voltage source VTEG and the input node NI.

The PMIC 100 may receive the input voltage VIN_BST through the input node NI, may include an inductor (refer to L in FIG. 4) to accumulate energy based on the input voltage VIN_BST and a rechargeable battery 110, may generate an output voltage VOUT based on the input voltage VIN_BST and selectively based on an internal input voltage (refer to VIN_BCK in FIG. 4) of the rechargeable battery 110 and may provide the output voltage VOUT to the WSN 500 through the output node NO.

The WSN 500 may include an ultra-low-power (ULP) transceiver (TRx) 511, an ULP sensor 513 and an ULP micro-processor (MCU) 515. The ULP TRx 511 may consume greatest energy in operating. The ULP TRx 511 may be connected to the output node NO through a switch SW and may receive the output voltage VOUT from the PMIC 100 only when the ULP TRx 511 transmits/receives data to/from an outside in a duty cycling mode. The ULP sensor 513 and the ULP MCU 515 may be directly connected to the output node NO. The WSN 500 is connected to the output node NO and a load current IL flowing from the output node NO to the WSN 500 may vary based on a current consumed by the WSN 500.

Figure 3:
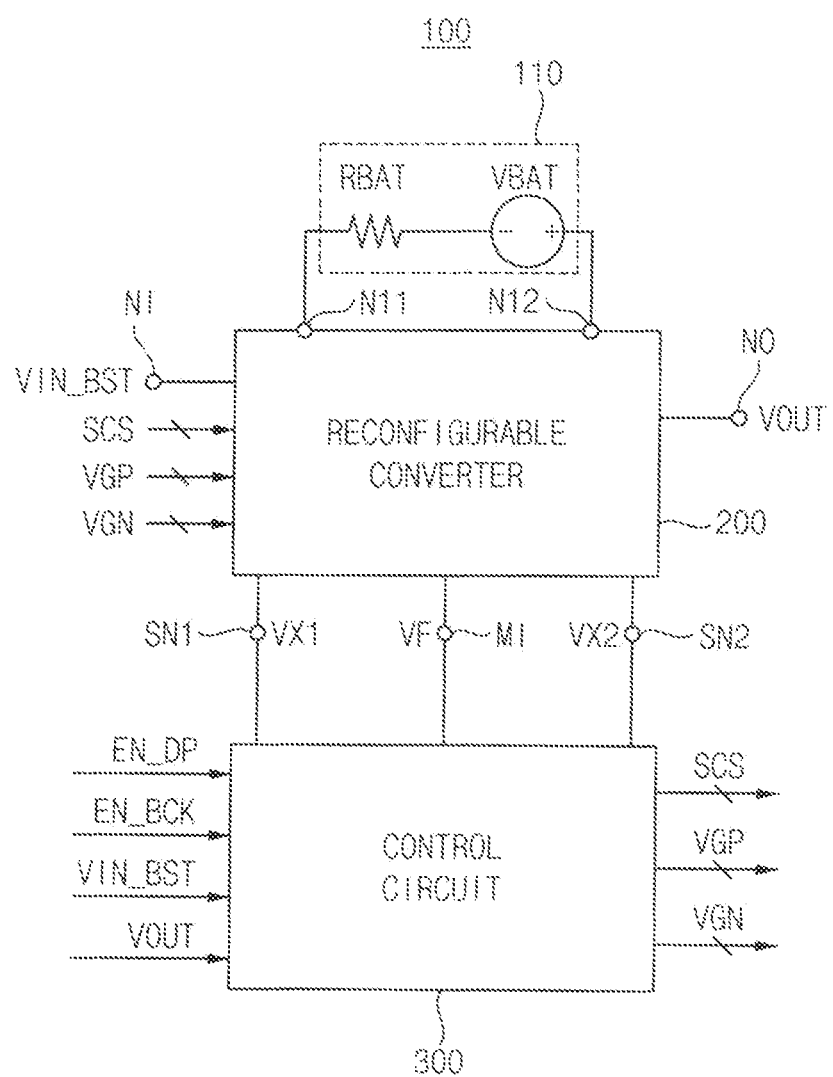
FIG. 3 is a block diagram of a PMIC in the energy harvesting system of FIG. 2 according to example embodiments.

FIG. 3 is a block diagram of a PMIC in the energy harvesting system of FIG. 2 according to example embodiments.

Referring to FIG. 3, the PMIC 100 may include the rechargeable battery 110, a reconfigurable converter 200 and a control circuit 300.

The rechargeable battery 110 may be connected to the reconfigurable converter 200 at a first node N11 and a second node N12. The rechargeable battery 110 may include a battery voltage VBAT and a battery resistor RBAT connected in series between the second node N12 and the first node N11.

The reconfigurable converter 200 may receive the input voltage VIN_BST through the input node NI, may include an inductor (refer to L in FIG. 4) to accumulate energy based on the input voltage VIN_BST, may generate the output voltage VOUT based on the input voltage VIN_BST and selectively based on the internal input voltage (refer to VIN_BCK in FIG. 4) of the rechargeable battery 110 and may provide the output voltage VOUT to the WSN 500 through the output node NO. The reconfigurable converter 200 may operate in one of a plurality of operation modes based on an available power provided from a thermoelectric device (the energy harvester 10) and a power consumption consumed by the WSN 500 and based on a plurality of switching control signals SCS and a plurality of driving control signals VGP and VGN, may harvest the energy from the thermoelectric device 10 until the WSN 500 consumes a maximum current generated by the thermoelectric device 10 and may drive the WSN 500 in response to the WSN 500 consuming a current greater than the maximum current generated by the thermoelectric device 10.

The control circuit 300 may generate the plurality of driving control signals VGP and VGN and the plurality of switching control signals SCS based on the input voltage VIN_BST, a first voltage VX1 of a first switching node SN1, a second voltage VX2 of a second switching node SN2 and the output voltage VOUT and may apply the plurality of driving control signals VGP and VGN and the plurality of switching control signals SCS based on the input voltage VIN_BST to the reconfigurable converter 200. The first switching node SN1 may be connected to a first terminal of the inductor and the second switching node SN2 may be connected to a second terminal of the inductor.

The control circuit 300 may be connected to the reconfigurable converter 200 at an intermediate node MI and may receive a filter voltage VF of the intermediate node MI.

The reconfigurable converter 200 may to operate in one of a plurality of operation modes based on the plurality of driving control signals VGP and VGN and the plurality of switching control signals SCS.

Figure 4:
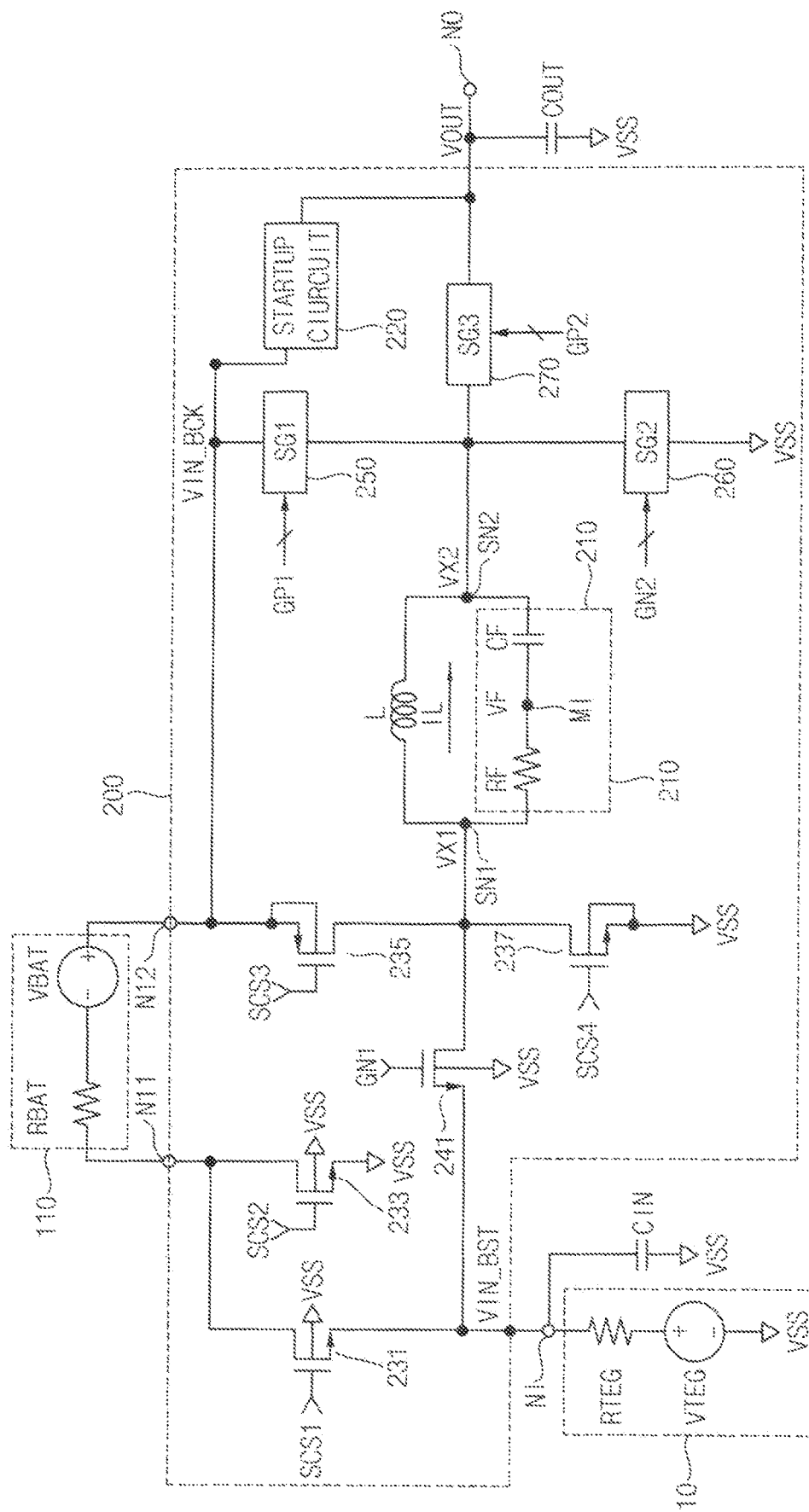
FIG. 4 is a circuit diagram of the reconfigurable converter in the PMIC of FIG. 3 according to example embodiments.

FIG. 4 is a circuit diagram of the reconfigurable converter in the PMIC of FIG. 3 according to example embodiments.

Figure 5A:
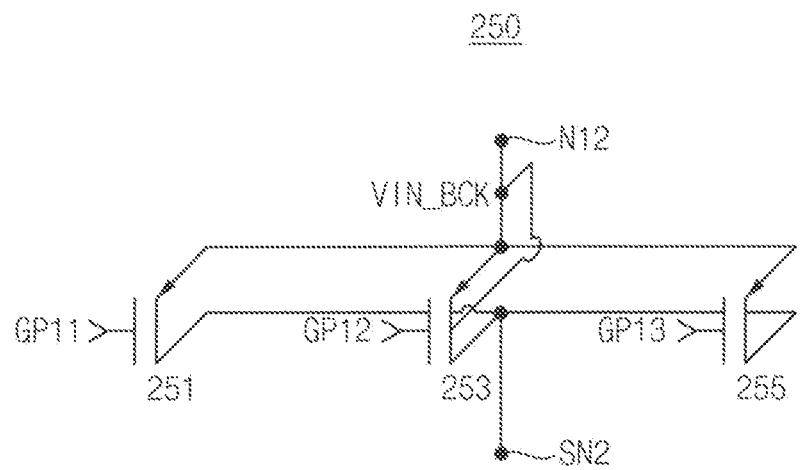
FIGS. 5A through 5C illustrate sixth through eighth switching elements in the reconfigurable converter of FIG. 4, respectively.
Figure 5B:
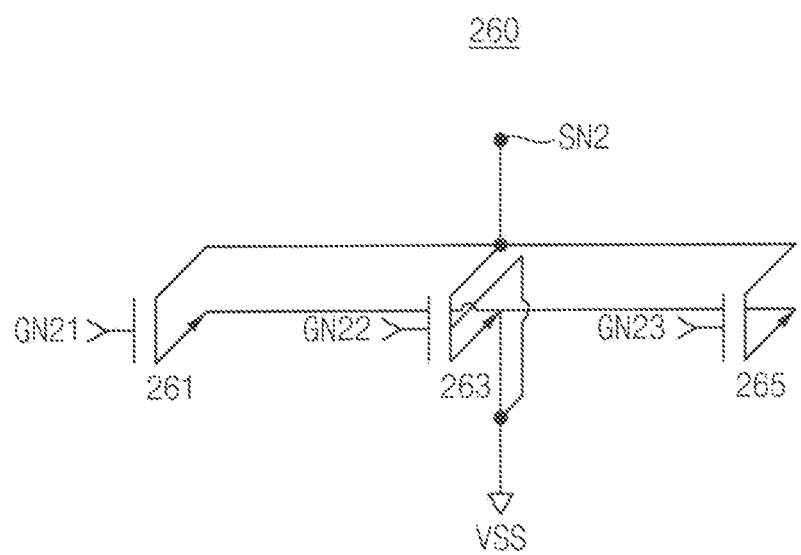
Figure 5C:
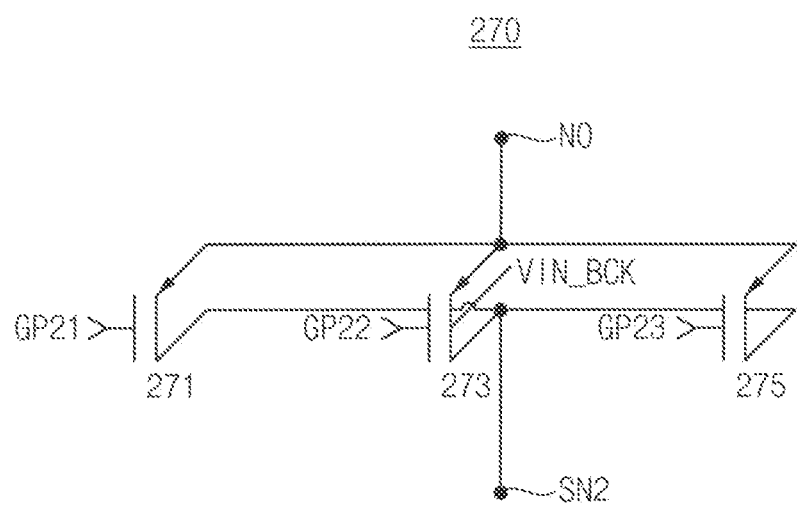

FIGS. 5A through 5C illustrate sixth through eighth switching elements in the reconfigurable converter of FIG. 4, respectively.

In FIG. 4, the recharge battery 110 and the thermoelectric device 10 are altogether illustrated for convenience of explanation and an output capacitor COUT coupled between the output node NO and the ground voltage VSS is also illustrated.

Referring to FIG. 4, the reconfigurable converter 200 may include an (single) inductor L, a filter 210, first through eighth switching elements 231, 233, 235, 237, 541, 250, 260 and 270, and a startup circuit 220.

The inductor L may be coupled between the first switching node SN1 and the second switching node SN2. An inductor current IL based on the input voltage VIN_BST and/or an internal input voltage VIN_BCK may flow through the inductor L and the inductor L may accumulate energy corresponding to the input voltage VIN_BST and/or the internal input voltage VIN_BCK.

The filter 210 may be coupled between the first switching node SN1 and the second switching node SN2 in parallel with the inductor L and may include a filter resistor RF and a filter capacitor CF which are connected to each other at the intermediate node MI. The filter 210 may provide the filter voltage VF at the intermediate node MI. The filter 210 may manage hysteresis of the inductor L.

The startup circuit 220 may drive the output node NO based on the internal input voltage VIN_BCK during an initial driving of the reconfigurable converter 200.

The first switching element 231 may be connected between the input node NI and the first node N11 coupled to a first end of the rechargeable battery 110, may receive a first switching control signal SCS1 and may connect the input node NI to the first node N11. The first switching element 231 may include a n-channel metal-oxide semiconductor (NMOS) transistor that has a drain coupled to the first node N11, a gate receiving the first switching control signal SCS1, a source coupled to the input node NI and a body coupled to the ground voltage VSS.

The second switching element 233 may be connected between the first node N11 and the ground voltage VSS, may receive a second switching control signal SCS2 and may connect the first node N11 to the ground voltage VSS in response to the second switching control signal SCS2. The second switching element 233 may include an NMOS transistor that has a drain coupled to the first node N11, a gate receiving the second switching control signal SCS2, a source coupled to the ground voltage VSS and a body coupled to the ground voltage VSS.

The third switching element 235 may be connected between the second node N12 and the first switching node SN1, may receive a third switching control signal SCS3 and may connect the second node N12 to the first switching node SN1 in response to the third switching control signal SCS3. The third switching element 235 may include a p-channel metal-oxide semiconductor (PMOS) transistor that has a source coupled to the second node N12, a gate receiving the third switching control signal SCS3, a drain coupled to the first switching node SN1 and a body coupled to the second node N12.

The fourth switching element 237 may be connected between the first switching node SN1 and the ground voltage VSS, may receive a fourth switching control signal SCS4 and connect the first switching node SN1 to the ground voltage VSS in response to the fourth switching control signal SCS4. The fourth switching element 237 may include an NMOS transistor that has a drain coupled to the first switching node SN1, a gate receiving the fourth switching control signal SCS4, a source coupled to the ground voltage VSS and a body coupled to the ground voltage VSS.

The fifth switching element 241 may be connected between the input node NI and the first switching node SN1, may receive a first driving control signal GN1 and may connect the input node NI to the first switching node SN1 in response to the first driving control signal GN1. The fifth switching element 241 may include an NMOS transistor that has a drain coupled to the first switching node SN1, a gate receiving the first driving control signal GN1, a source coupled to the input node NI and a body coupled to the ground voltage VSS.

The sixth switching elements (SG1) 250 may connected in parallel between the second node N12 and the second switching node SN2, may receive a second driving control signal GP1 and may selectively connect the second node N12 to the second switching node SN2 in response to the second driving control signal GP1. The sixth switching elements 250, as illustrated in FIG. 5A may include switching elements 251, 253, 255 which are connected in parallel between the second node N12 and the second switching node SN2, and each of the switching elements 251, 253, 255 may include a PMOS transistor that has a source coupled to the second node N12, a gate receiving respective one of sub driving signals GP11, GP12 and GP13 of the second driving control signal GP1, a drain coupled to the second switching node SN2 and a body receiving the internal input voltage VIN_BCK.

The seventh switching elements (SG2) 260 may connected in parallel between the second switching node SN2 and the ground voltage VSS, may receive a third driving control signal GN2 and may selectively connect the second switching node SN2 to the ground voltage VSS, in response to the third driving control signal GN2. The seventh switching elements 260, as illustrated in FIG. 5B may include switching elements 261, 263, 265 which are connected in parallel between the second switching node SN2 and the ground voltage VSS, and each of the switching elements 261, 263, 265 may include an NMOS transistor that has a drain coupled to the second switching node SN2, a gate receiving respective one of sub driving signals GN21, GN22 and GN23 of the third driving control signal GN2, a drain coupled to the ground voltage VSS and a body coupled to the ground voltage VSS.

The eighth switching elements (SG3) 270 may connected in parallel between the second switching node SN2 and the output node NO, may receive a fourth driving control signal GP2 and may selectively connect the s second switching node SN2 to the output node NO in response to the fourth driving control signal GP2. The eighth switching elements 270, as illustrated in FIG. 5C may include switching elements 271, 273, 275 which are connected in parallel between the second switching node SN2 and the output node NO, and each of the switching elements 271, 273, 275 may include a PMOS transistor that has a source coupled to the second switching node SN2, a gate receiving respective one of sub driving signals GP21, GGP22 and GP23 of the fourth driving control signal GP2, a drain coupled to the second switching node SN2 and a body receiving the internal input voltage VIN_BCK.

The output capacitor COUT may be coupled between the output node NO and the ground voltage VSS and may store the output voltage VOUT.

Referring to FIGS. 2 through 4, when the input voltage VIN_BST is input to the PMIC 100 through the input node NI from the energy harvester 10, an input voltage with respect to the reconfigurable converter 200 from the input node NI corresponds to RINB and the input voltage VIN corresponds to a half VTEG/2 of the DC voltage source VTEG, a maximum power is transferred from the energy harvester 10 to the reconfigurable converter 200. In this case, an average value IL_AVG of the inductor current IL flowing through the inductor L corresponds to VTEG/(2RINB) and the maximum power corresponds to $VTEG^2/(4RINB)$.

Figure 6:
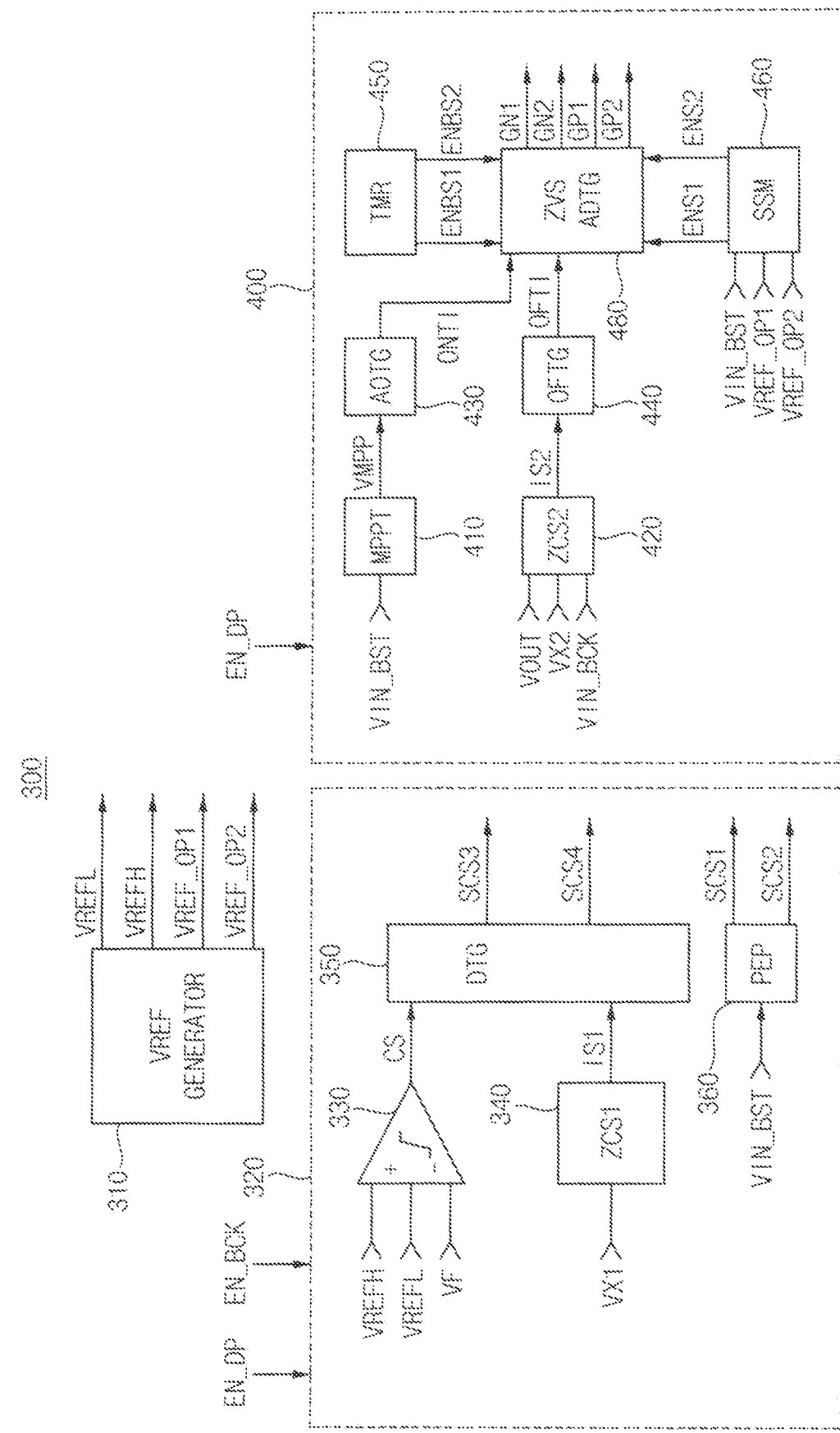
FIG. 6 is a block diagram of the control circuit in the PMIC of FIG. 3 according to example embodiments.

FIG. 6 is a block diagram of the control circuit in the PMIC of FIG. 3 according to example embodiments.

Referring to FIG. 6, the control circuit 300 may include a reference voltage generator 310, a first controller 320 and a second controller 400.

The reference voltage generator 310 may generate a first reference voltage VREFL, a second reference voltage VREFH, a first operating reference voltage VREF_OP1 and a second operating reference voltage VREF_OP2.

The first controller 320 may generate the first switching control signal SCS1 and the second switching control signal SCS2 based on the input voltage VIN, and may generate the third switching control signal SCS3 and the fourth switching control signal SCS4 based on the first reference voltage VREFL, the second reference voltage VREFH, the filter voltage VF and the first voltage VX1. The second controller 400 mayo generate the first through fourth driving control signals GN1, GP1, GN2 and GP2 based on the input voltage VIN_BST, the output voltage VOUT, the second voltage VX2, the internal input voltage VIN_BCK, the first operating reference voltage VREF_OP1 and the second operating reference voltage VREF_OP2.

The first controller 320 may include a comparator 330, a zero-current sensor (ZCS1) 340, a dead-time generator (DTD) 350 and a Peltier effect preventer (PEP) 360.

The Peltier effect preventer 360 may generate the first switching control signal SCS1 and the second switching control signal SCS2 based on the sign of the input voltage VIN_BST.

The comparator 330 may compare the filter voltage VF with the first reference voltage VREFL and the second reference voltage VREFH to generate a comparison signal CS based on whether the filter voltage VF is between the first reference voltage VREFL and the second reference voltage VREFH. The comparator 330 may be a hysteresis comparator.

The zero-current sensor 340 may detect a zero value of the inductor current IL flowing through the inductor L based on the first voltage VX1 to generate an internal signal IS1.

The dead-time generator 350 may generate the third switching control signal SCS3 and the fourth switching control signal SCS4 having a fixed dead time based on the comparison signal CS and the internal signal IS1.

The second controller 400 may include a maximum power transfer voltage tracking (MPPT) circuit 410, an adaptive on-time voltage generator (AOTG) 430, a zero-current sensor (ZCS2), an off-time generator (OFTG) 440, a time-multiplexing regulator (TMR) 450, a switch size modulator (SSM) 460 and an adaptive dead-time generator (ZVS ADTG) 480.

The MPPT circuit 410 may track a maximum power transfer voltage VMPP based on the input voltage VIN_BST when a maximum power is transferred to the WSN 500 from the energy harvester 10 and may provide the maximum power transfer voltage VMPP to the adaptive on-time voltage generator 430. The adaptive on-time voltage generator 430 may generate on-time information ONTI associated with activation intervals of the first through fourth driving control signals GN1, GP1, GN2 and GP2 based on the maximum power transfer voltage VMPP.

The zero-current sensor 420 may detect a zero value of the inductor current IL flowing through the inductor L based on the output voltage VOUT, the second voltage VX2 and the interval input voltage VIN_BCK to generate an internal signal IS indicating that the zero current are detected.

The off-time generator 440 may generate off-time information OFTI associated with deactivation intervals of the first through fourth driving control signals GN1, GP1, GN2 and GP2 based on the internal signal IS2.

The switch size modulator 460 may compare the input voltage VIN_BST with the first operating reference voltage VREF_OP1 and the second operating reference voltage VREF_OP2 to generate a first enable signal ENS1 and a second enable signal ENS2 which are associated with activation of sub driving signals of each of the first through fourth driving control signals GN1, GP1, GN2 and GP2.

The time-multiplexing regulator 450 may generate a third enable signal ENBS1 and a fourth enable signal ENBS2 designating a time-multiplexing associated with storing a surplus power which is not consumed by the WSN 500 in the rechargeable battery 110.

The adaptive dead-time generator 480 may determine activation interval and deactivation interval of the first through fourth driving control signals GN1, GP1, GN2 and GP2 based on the on-time information ONTI, the off-time information OFTI, the a third enable signal ENBS1 and the fourth enable signal ENBS2, and may determine a number of the sub driving signals, which are enabled, of each of the first through fourth driving control signals GN1, GP1, GN2 and GP2 based on the first enable signal ENS1 and the second enable signal ENS2.

Figure 7:
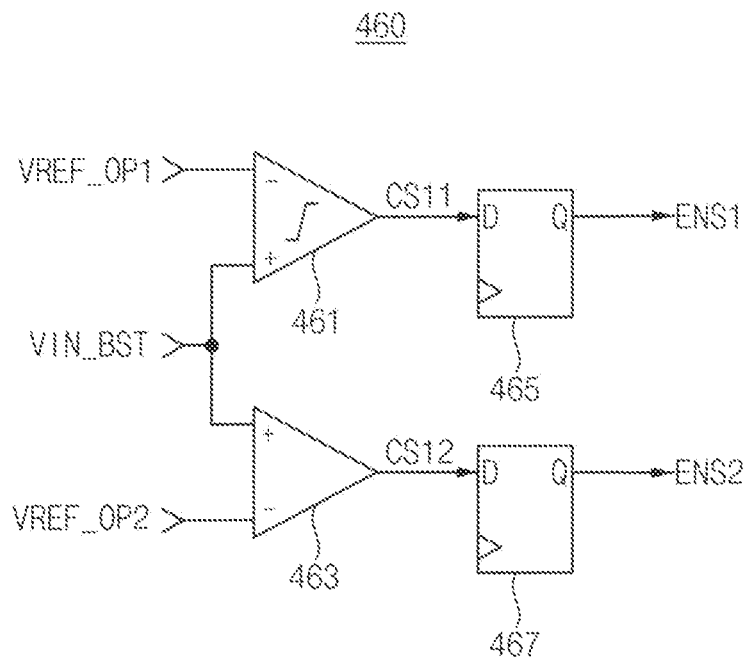
FIG. 7 is a circuit diagram of the switch size modulator in the control circuit of FIG. 6 according to example embodiments.

FIG. 7 is a circuit diagram of the switch size modulator in the control circuit of FIG. 6 according to example embodiments.

Referring to FIG. 7, the switch size modulator 460 may include a first comparator 461, a second comparator 463, a first flip-flop 465 and a second flip-flop 467.

The first comparator 461 may compare the input voltage VIN_BST with the first operating reference voltage VREF_OP1 to output a first comparison signal CS11. The second comparator 463 may compare the input voltage VIN_BST with the second operating reference voltage VREF_OP2 to output a second comparison signal CS12. The first flip-flop 465 may latch the first comparison signal CS11 to output the first enable signal ENS1. The second flip-flop 467 may latch the second comparison signal CS12 to output the second enable signal ENS2.

Therefore, when the second operating reference voltage VREF_OP2 is greater than the first operating reference voltage VREF_OP1, the adaptive dead-time generator 480 may determine a level of the input voltage VIN_BST based on logic levels of the first enable signal ENS1 and the second enable signal ENS2.

Figure 8:
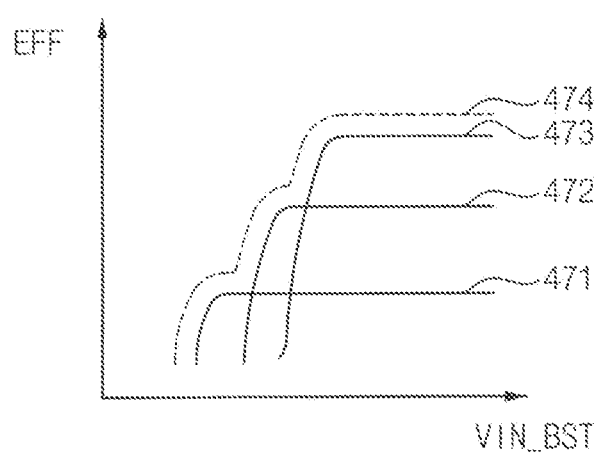
FIG. 8 illustrates efficiency according to a number of sub driving signals, which are enabled, of the third driving control signal based on a level of the input voltage.

FIG. 8 illustrates efficiency according to a number of sub driving signals, which are enabled, of the third driving control signal based on a level of the input voltage.

In FIG. 8, a reference numeral 471 denotes efficiency EFF of the reconfigurable converter 200 when the sub driving signal GN21 from among the sub driving signals GN21, GN22 and GN23 of the third driving control signal GN2 is enabled as a level of the input voltage VIN_BST increases, a reference numeral 472 denotes efficiency EFF when the sub driving signals GN21 and GN22 from among the sub driving signals GN21, GN22 and GN23 of the third driving control signal GN2 is enabled as a level of the input voltage VIN_BST increases, a reference numeral 473 denotes efficiency EFF when the sub driving signals GN21, GN22 and GN23 of the third driving control signal GN2 is enabled as a level of the input voltage VIN_BST increases, and a reference numeral 474 denotes efficiency EFF when a number of sub driving signals, which are enabled, from among the sub driving signals GN21, GN22 and GN23 of the third driving control signal GN2 varies as a level of the input voltage VIN_BST increases.

The reconfigurable converter 200 may operate in one of first through fourth operation modes based on a comparison of an available power (refer to PTEG in FIG. 13) of the energy harvester 10 and a power consumption (refer to POUT in FIG. 13) of the WSN 500 and based on a sign of the available power PTEG.

When the power consumption POUT is smaller than the available power PTEG of the energy harvester 10, the reconfigurable converter 200 may operate in the first operation mode. When the power consumption POUT is greater than the available power PTEG of the energy harvester 10 and the sign of the available power PTEG is positive, the reconfigurable converter 200 may operate in one of the second operation mode and the third operation mode. When the power consumption POUT is greater than the available power PTEG of the energy harvester 10 and the sign of the available power PTEG is negative, the reconfigurable converter 200 may operate in the fourth operation mode.

Figure 9:
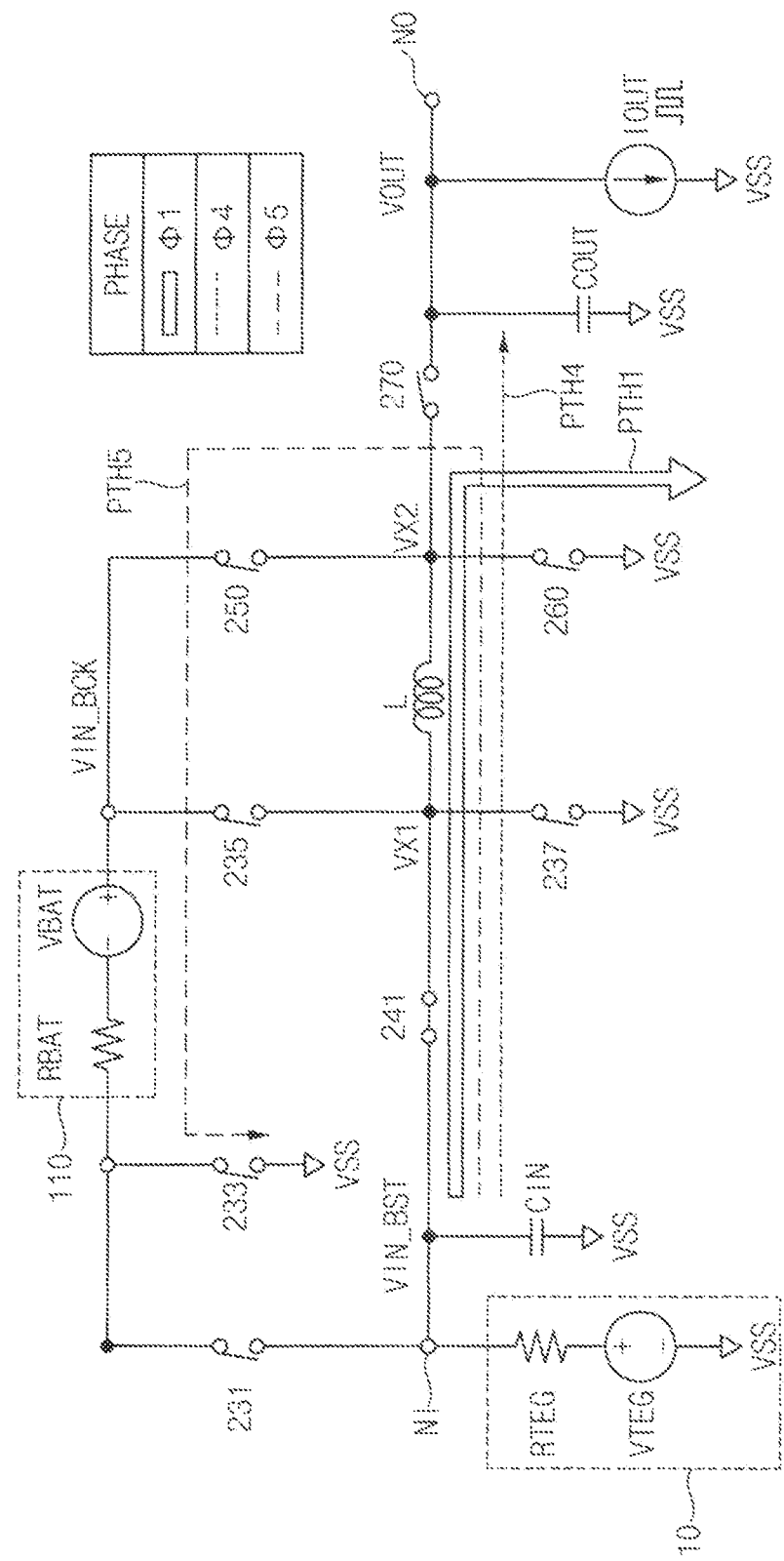
FIG. 9 illustrates the reconfigurable converter of FIG. 4 in the first operation mode according to example embodiments.

FIG. 9 illustrates the reconfigurable converter of FIG. 4 in the first operation mode according to example embodiments.

Referring to FIGS. 4 and 9, in the first operation mode, the reconfigurable converter 200 may operate as a single-input dual-output (SIDO) boost converter which stores the input voltage VIN_BST in the inductor L as a path PTH1 indicates, may provide the WSN 500 or the output node NO with the available power based on the energy accumulated in the inductor L as and may store a surplus power not consumed by the WSN 500 in the rechargeable battery 110 as a path PTH5 indicates. The reconfigurable converter 200 may store the surplus power in the rechargeable battery 110 based on a time-multiplexing.

In FIG. 9, each of phases Φ1, Φ4 and Φ5 may correspond to respective one of the paths PTH1, PTH4 and PTH5. During the phase Φ14, the first through fourth switching elements 231, 233, 235 and 237 are turned-off, the fifth switching element 241 and the eighth switching elements 270 are conducting and the sixth switching elements 250 and the seventh switching elements 260 are turned-off such that reconfigurable converter 200 provides the WSN 500 with the energy stored in the inductor L based on the input voltage VIN_BST as the available power. During the phase Φ5, the second switching element 233, the fifth switching element 241, the sixth switching elements 250 and the eighth switching elements 270 are conducting, and the first switching element 231, the third switching element 235, the fourth switching element 241, and the seventh switching elements 260 are turned-off such that the reconfigurable converter 200 stores the surplus power in the rechargeable battery 110.

Figure 10:
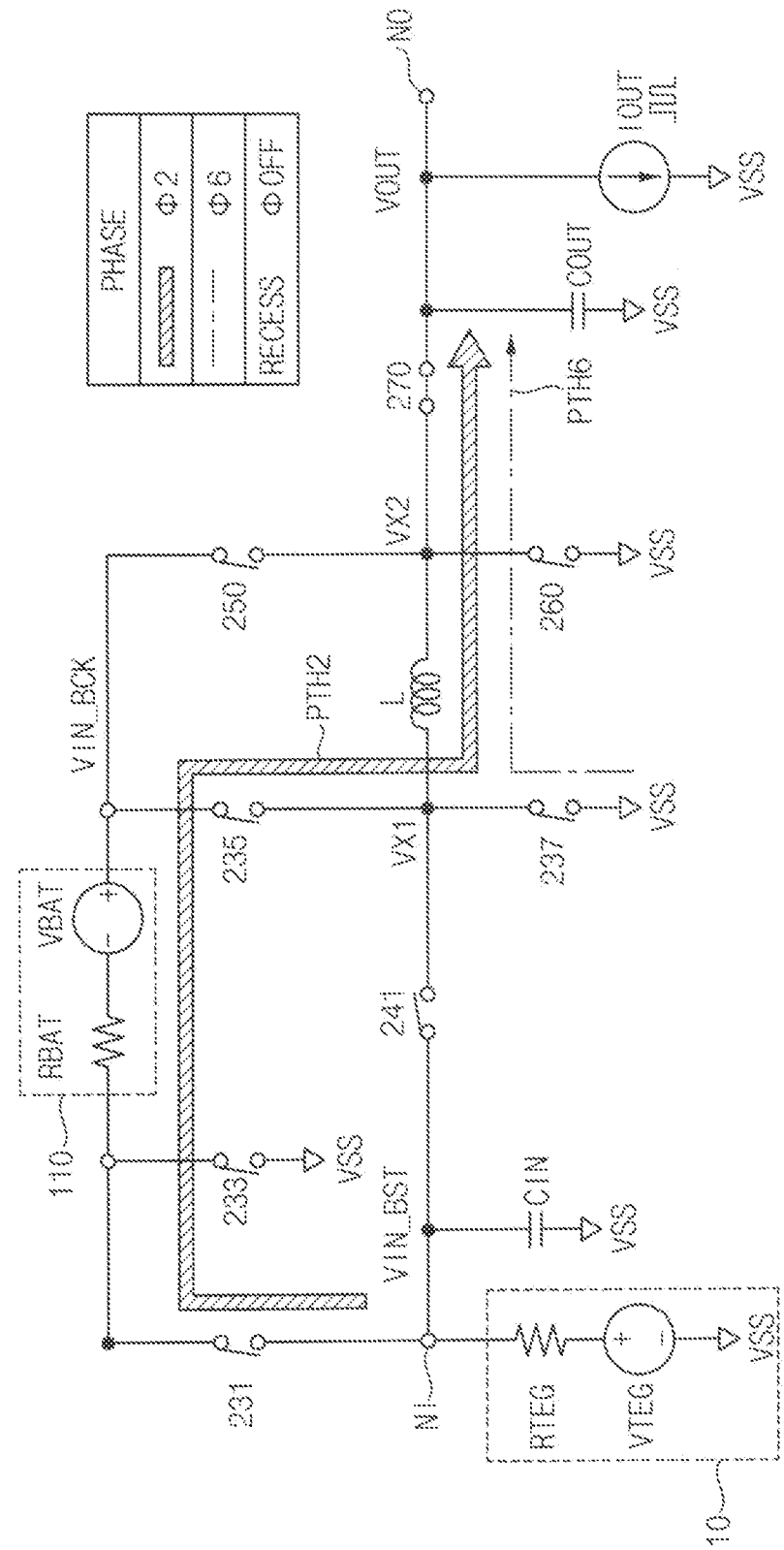
FIG. 10 illustrates the reconfigurable converter of FIG. 4 in the second operation mode according to example embodiments.

FIG. 10 illustrates the reconfigurable converter of FIG. 4 in the second operation mode according to example embodiments.

Referring to FIGS. 4 and 10, in the second operation mode, the control circuit 300 may connect the thermoelectric device 10 and the rechargeable battery 110 in series such that the reconfigurable converter 200 operates as a battery-TEG pile-up buck (BTPB) converter and the reconfigurable converter 200 may regulate the output voltage VOUT based on the input voltage VIN_BST and the internal input voltage VIN_BCK as a path PTH2 indicates. In addition, the output node NO is connected to the ground voltage VSS.

In FIG. 10, each of phases Φ2 and Φ6 may correspond to respective one of the paths PTH2 and PTH6. In addition, a recess phase ΦOFF indicates that all switching elements in the reconfigurable converter 200 are turned-off.

During the phase Φ2, the first switching element 231, the third switching element 235 and the eighth switching elements 270 are conducting the second switching element 233, the fourth switching element 237, the fifth switching element 241, the sixth switching elements 250 and the seventh switching elements 260 are turned-off such that the thermoelectric device 10 and the rechargeable battery 110 are connected in series and the reconfigurable converter 200 provides the WSN 500 connected to the output node NO with the energy stored in the inductor L based on the input voltage VIN_BST and the internal input voltage VIN_BCK as the available power.

Figure 11:
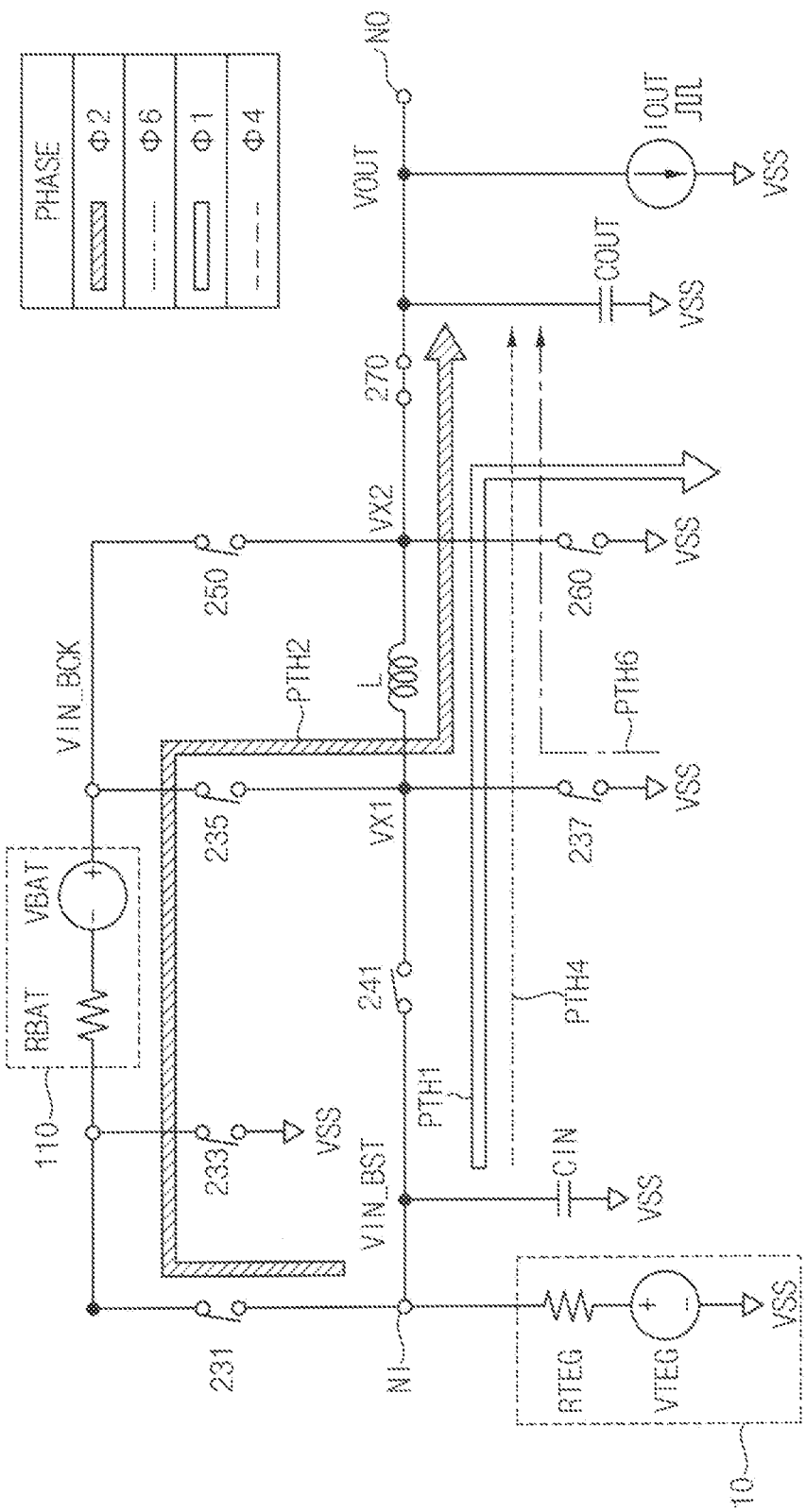
FIG. 11 illustrates the reconfigurable converter of FIG. 4 in the fourth operation mode according to example embodiments.

FIG. 11 illustrates the reconfigurable converter of FIG. 4 in the fourth operation mode according to example embodiments.

Referring to FIGS. 4 and 11, in the third operation mode, the control circuit 300 may connect the thermoelectric device 10 and the rechargeable battery 110 such that the reconfigurable converter 200 may operate as one of a BTPB converter and a dual-phase buck-boost (DPBB) converter that uses the BTBB converter and a buck-boost in combination.

The reconfigurable converter 200 may perform operations corresponding to the phases Φ2 and Φ6 in FIG. 10 and the phases Φ1 and Φ4 in FIG. 9 in the third operation mode.

Figure 12:
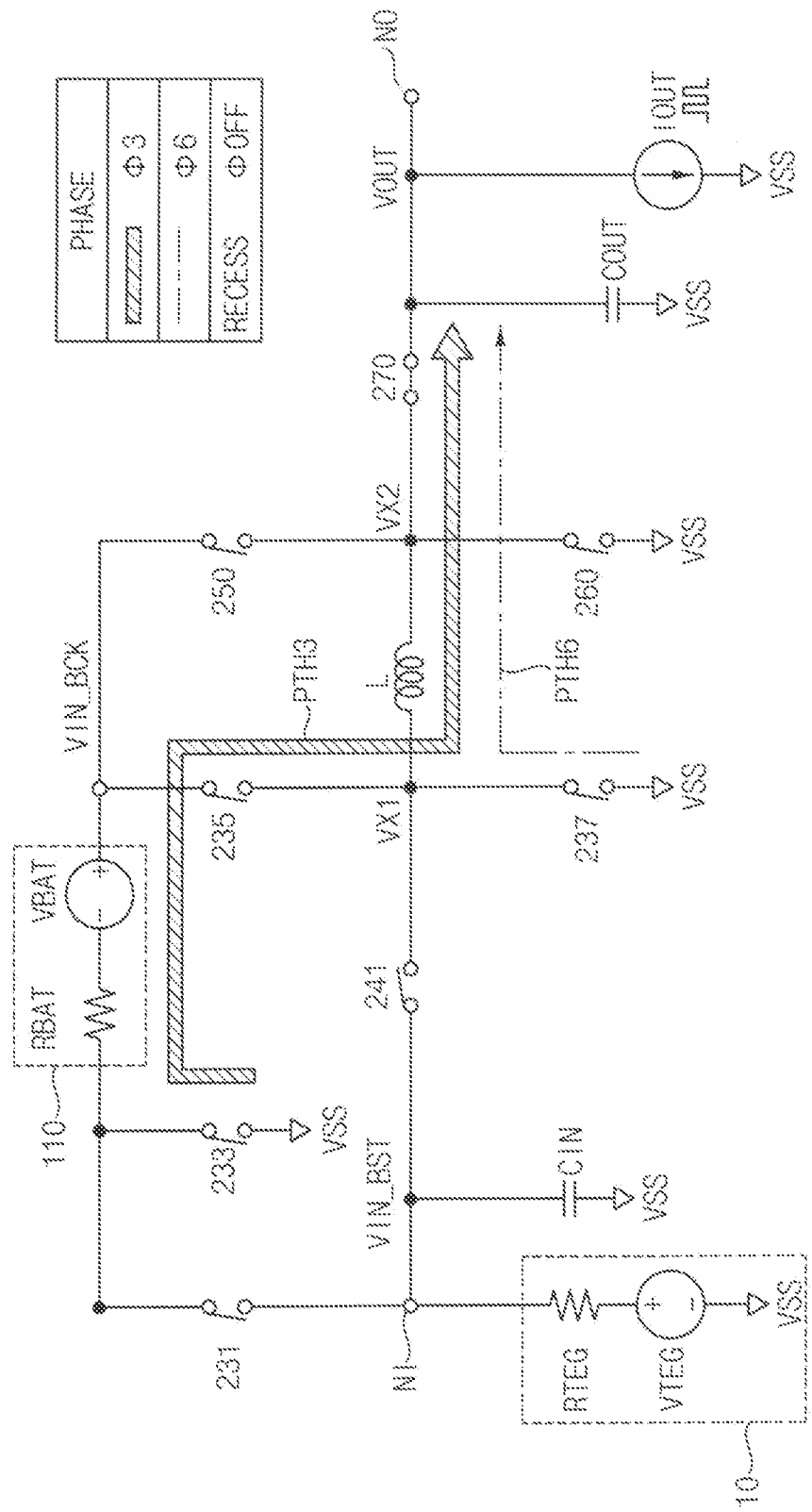
FIG. 12 illustrates the reconfigurable converter of FIG. 4 in the fourth operation mode according to example embodiments.

FIG. 12 illustrates the reconfigurable converter of FIG. 4 in the fourth operation mode according to example embodiments.

Referring to FIGS. 4 and 12, in the fourth operation mode, the control circuit 300 may separate the thermoelectric device 10 from the rechargeable battery 110 in series such that the reconfigurable converter 200 operates as a battery-supplied buck converter. The reconfigurable converter 200 may regulate the output voltage VOUT based on the internal input voltage VIN_BCK as a path PTH3 indicates.

In the fourth operation mode, the second switching element 233, the third switching element 235 and the eighth switching elements 270 are conducting and the first switching element 231, the fourth switching element 237, the fifth switching element 241, the sixth switching elements 250 and the seventh switching elements 260 are turned-off such that the thermoelectric device 10 and the thermoelectric device 10 is separated from the rechargeable battery 110 and the reconfigurable converter 200 provides the WSN 500 connected to the output node NO with the energy stored in the inductor L based on the input voltage VIN_BST as the available power.

In FIG. 12, a phase Φ3 corresponds to the path PTH3.

The reconfigurable converter 200 may perform operations corresponding to the phases Φ6 and ΦOFF in the fourth operation mode.

Figure 13:
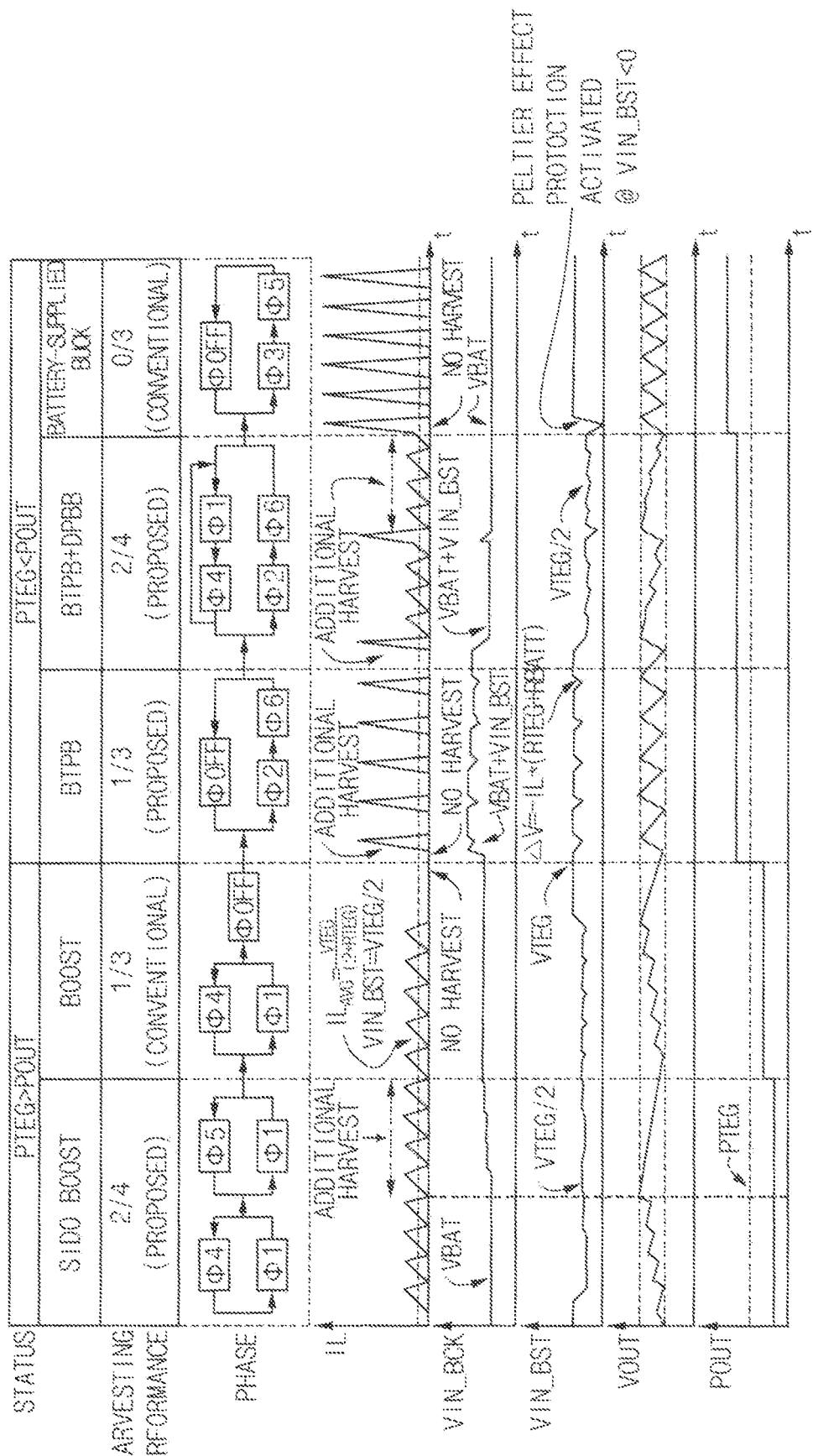
FIG. 13 illustrates an input voltage, an internal input voltage, an output voltage, a power consumption and a harvesting performance index of the reconfigurable converter of FIG. 4 in each of the first through fourth operation modes.

FIG. 13 illustrates an input voltage, an internal input voltage, an output voltage, a power consumption and a harvesting performance index of the reconfigurable converter of FIG. 4 in each of the first through fourth operation modes.

In FIG. 13, SIDO BOOST corresponds to the first operation mode in FIG. 9, BTPB corresponds to the second operation mode in FIG. 10, BTPB+DPBB corresponds to the third operation mode in FIG. 11 and BATTERY-SUPPLIED BUCK corresponds to the third operation mode in FIG. 12.

In SIDO BOOST mode, the recess phase ΦOFF is replaced with the phase ΦOFF that harvests energy from the thermoelectric device 10, and the reconfigurable converter may increase harvesting performance. In addition, in BATTERY-SUPPLIED BUCK, the thermoelectric device 10 consumes an energy because the sign of the input voltage VIN_BST having a negative sign, the controller 300 separate the thermoelectric device 10 from the rechargeable battery 110 and may increase harvesting performance by driving the WSN 500 based on the rechargeable battery 110.

In FIG. 13, the inductor current IL in each of the first through fourth operation modes is illustrated.

Figure 14:
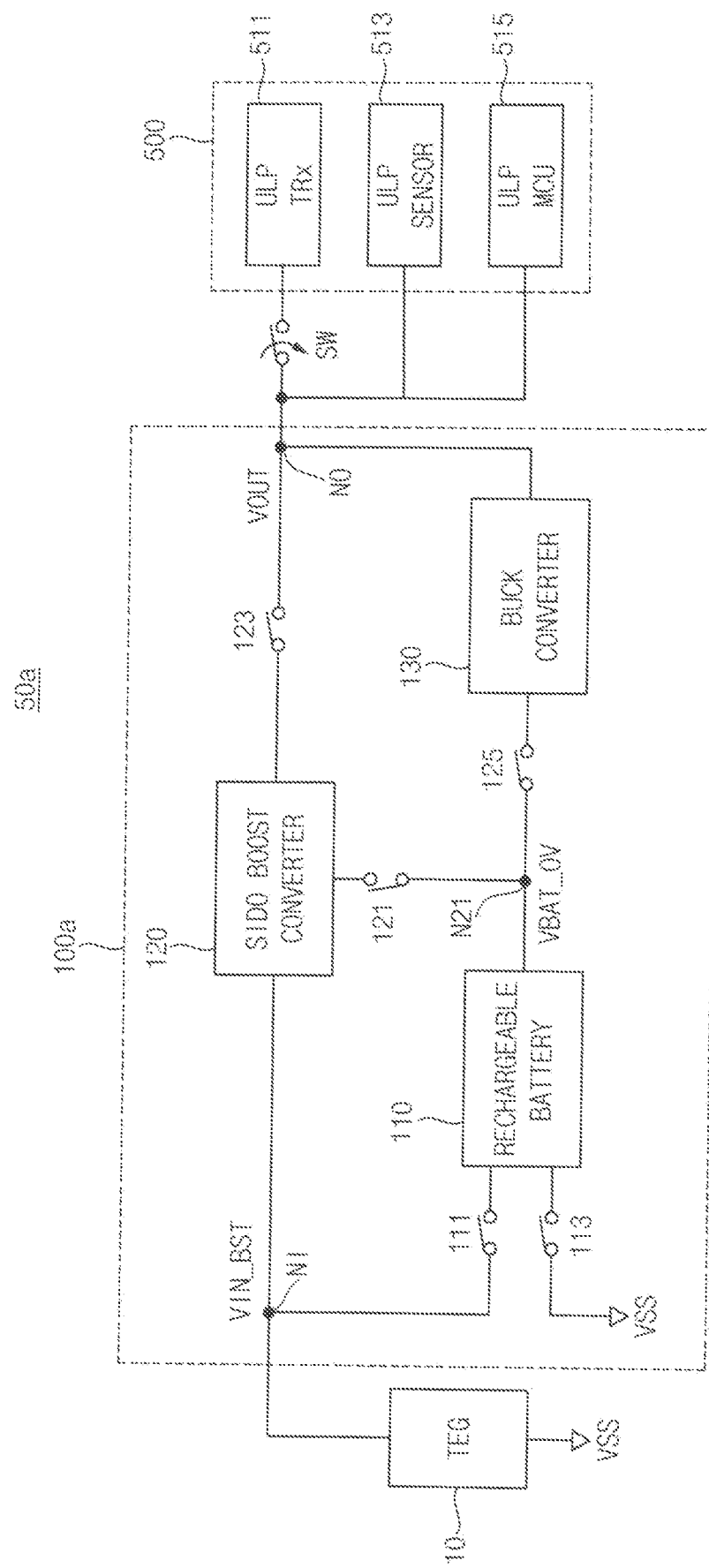
FIG. 14 is a block diagram of an energy harvesting system according to example embodiments.

FIG. 14 is a block diagram of an energy harvesting system according to example embodiments.

Referring to FIG. 14, an energy harvesting system 50a may include an energy harvester 10, a PMIC 100a including a rechargeable battery 110 and a 500. The energy harvester 10 may be implemented with a thermoelectric device and may be referred to as a thermoelectric generator (TEG). The WSN 500 may be referred to as a load.

The PMIC 100a may be connected to the energy harvester 10 at the input node NI and may be connected to the WSN 500 at an output node NO.

The PMIC 100a may receive the input voltage VIN_BST through the input node NI, may include an inductor (refer to L in FIG. 4) to accumulate energy based on the input voltage VIN_BST and a rechargeable battery 110, may generate an output voltage VOUT based on the input voltage VIN_BST and selectively based on an internal input voltage of the rechargeable battery 110 and may provide the output voltage VOUT to the WSN 500 through the output node NO.

The WSN 500 may include a ULP TRx 511, an ULP sensor 513 and an ULP MCU 515. The ULP TRx 511 may consume greatest energy in operating. The ULP TRx 511 may be connected to the output node NO through a switch SW and may receive the output voltage VOUT from the PMIC 100 only when the ULP TRx 511 transmits/receives data to/from an outside in a duty cycling mode. The ULP sensor 513 and the ULP MCU 515 may be directly connected to the output node NO. The WSN 500 is connected to the output node NO and a load current IL flowing from the output node NO to the WSN 500 may vary based on a current consumed by the WSN 500.

The PMIC 100a may include the rechargeable battery 110, a SIDO boost converter 120, a buck converter 130. The SIDO boost converter 120 and the buck converter 130 may share the inductor (not illustrated). The PMIC 100a may operate in one of a plurality of operation modes based on an available power provided from a thermoelectric device (the energy harvester 10) and a power consumption consumed by the WSN 500, and may harvest the energy from the thermoelectric device 10 until the WSN 500 consumes a maximum current generated by the thermoelectric device 10.

The PMIC 100a may further include first through fifth switches 111, 113, 121, 123 and 125. The first switch 111 may connect the rechargeable battery 110 to the input node NI, the second switch 113 may connect the rechargeable battery 110 to the ground voltage VSS, the third switch 121 may connect the rechargeable battery 110 to the SIDO boost converter 120 at a node N21, the fifth switch 125 may connect the rechargeable battery 110 to the buck converter 130 at the node N21 and the fourth switch 123 may connect SIDO boost converter 120 to the output node NO. A battery operating voltage VBAT_OV may be provided at the node N21.

The PMIC 100a may include a control circuit such as the control circuit 300 of FIG. 6 and may control the first through fifth switches 111, 113, 121, 123 and 125.

Figure 15:
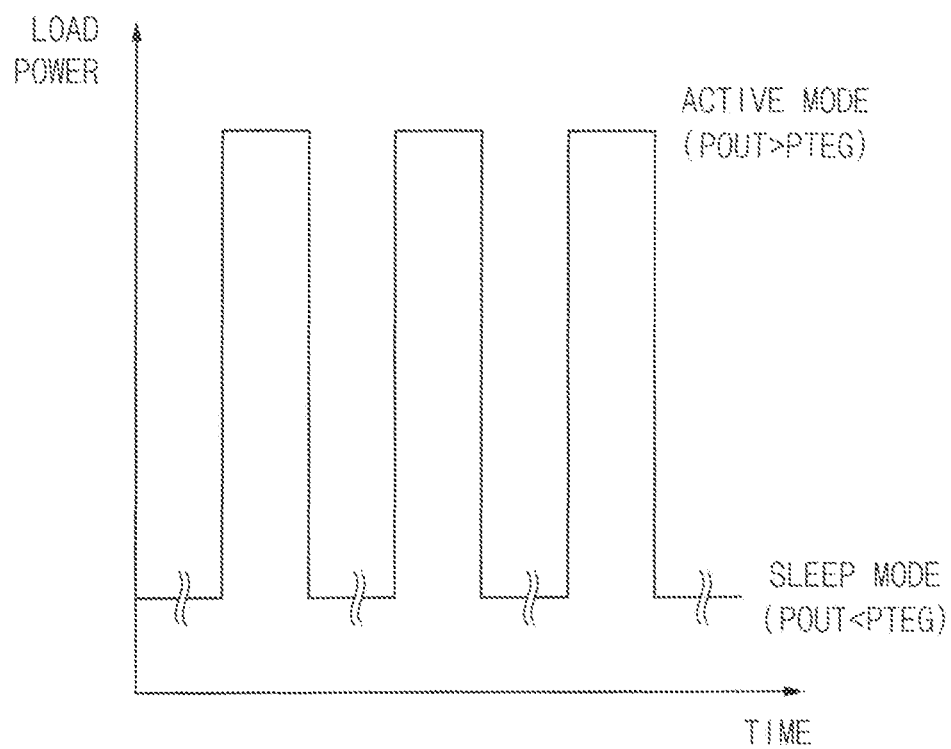
FIG. 15 illustrates a power consumed by the WSN in the energy harvesting system of FIG. 14.

FIG. 15 illustrates a power consumed by the WSN in the energy harvesting system of FIG. 14.

Referring to FIGS. 14 and 15, when the ULP TRx 511 transmits/receives data to/from an outside, the power consumption POUT consumed by the WSN 500 is greater than the available power PTEG of the energy harvester 10. When the ULP TRx 511 does not transmit/receive data to/from an outside, the power consumption POUT consumed by the WSN 500 is smaller than the available power PTEG of the energy harvester 10.

Figure 16:
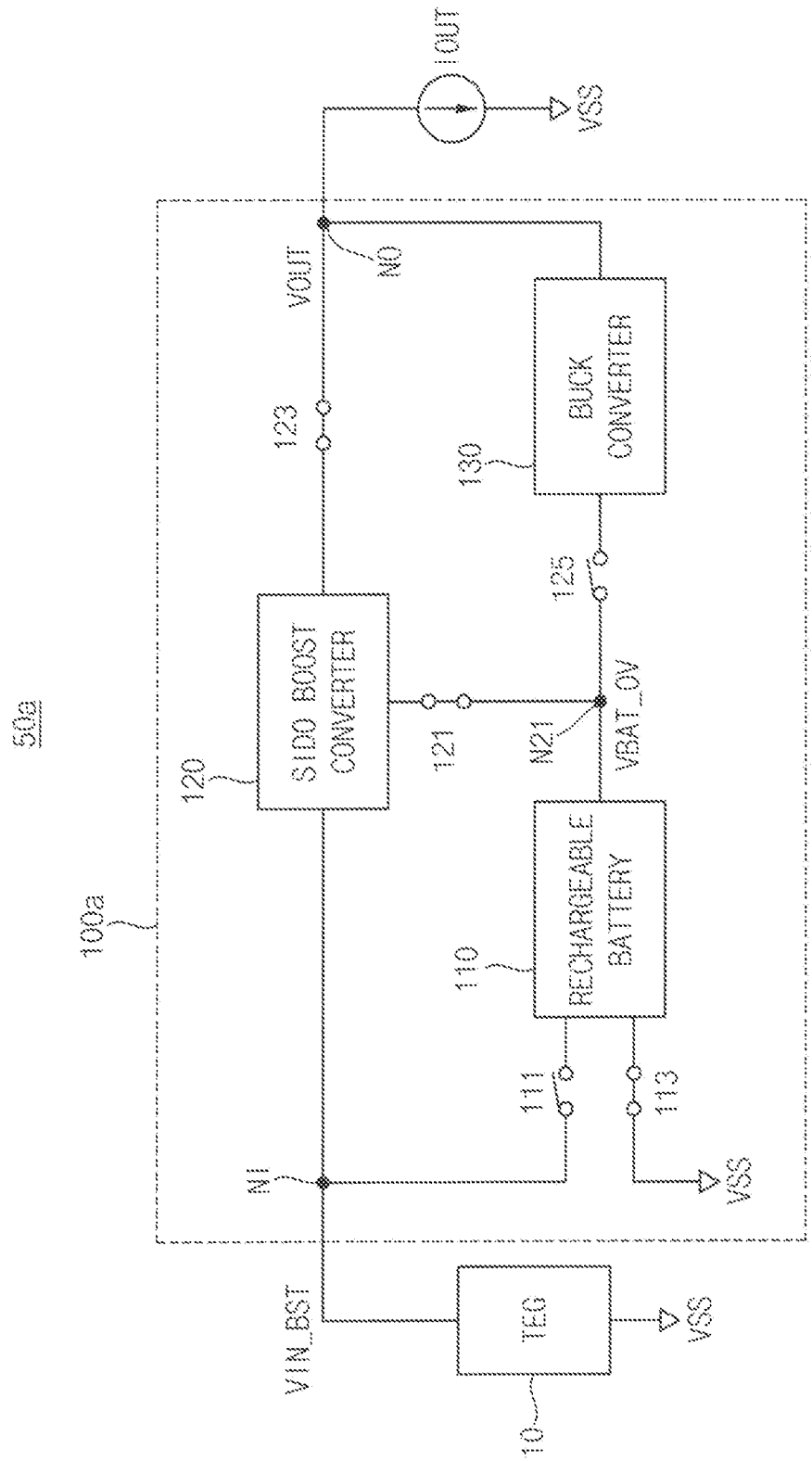
FIG. 16 illustrates the energy harvesting system of FIG. 14 in a first operation mode the power consumption consumed by the WSN is smaller than the available power of the energy harvester.

FIG. 16 illustrates the energy harvesting system of FIG. 14 in a first operation mode the power consumption consumed by the WSN is smaller than the available power of the energy harvester.

Referring to FIG. 16, in the first operation mode, the second switch 113, the third switch 121 and the fourth switch 123 are conducting and the first switch 111 and the fifth switch 125 are turned-off. The PMIC 100a provides the available power to the WSN 500 and stores a surplus power not consumed by the WSN 500 in the rechargeable battery 110 using the SIDO boost converter 120.

Figure 17:
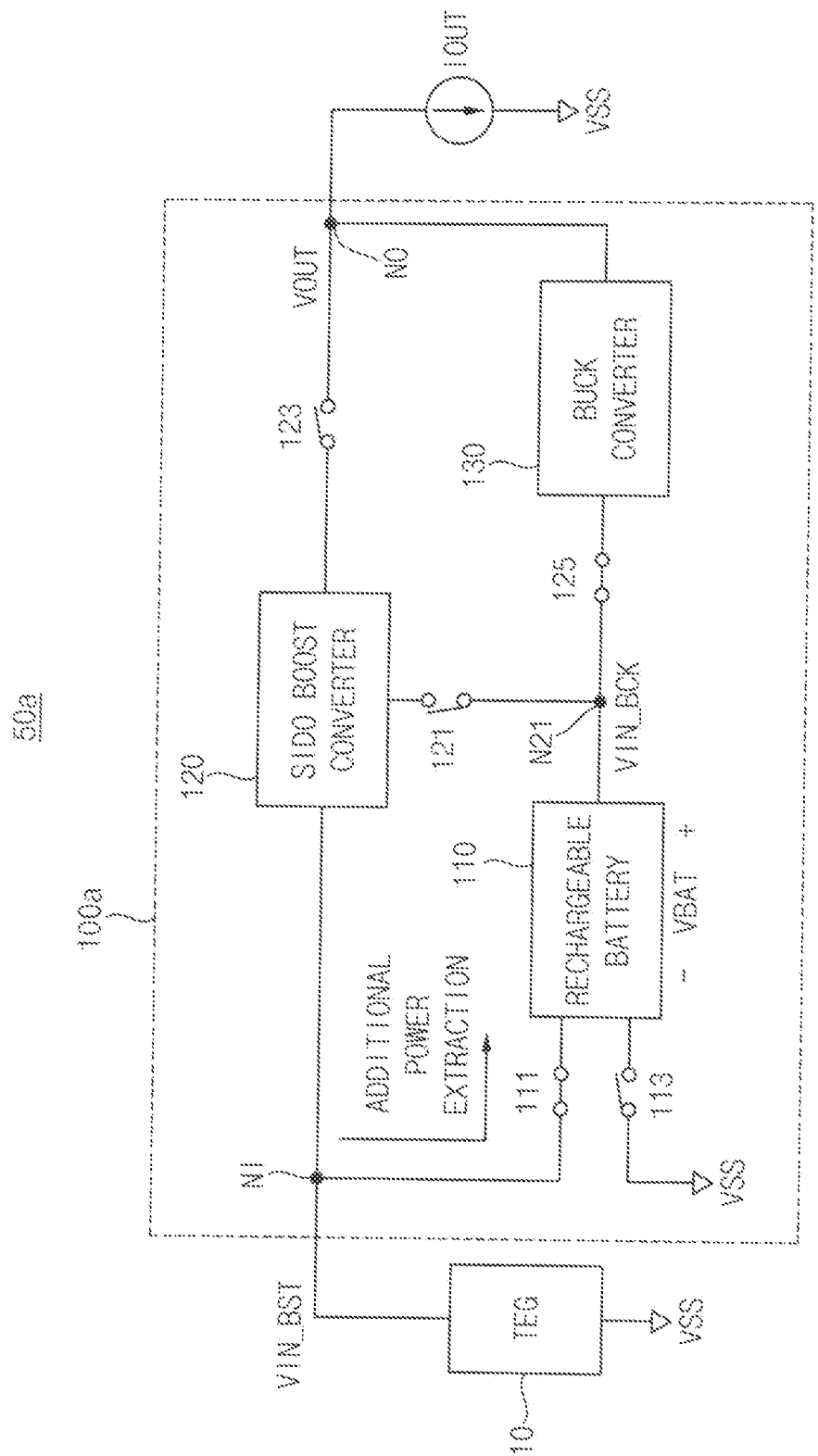
FIG. 17 illustrates the energy harvesting system of FIG. 14 in a second operation mode the power consumption consumed by the WSN is greater than the available power of the energy harvester and a sign of the available power has a positive sign.

FIG. 17 illustrates the energy harvesting system of FIG. 14 in a second operation mode the power consumption consumed by the WSN is greater than the available power of the energy harvester and a sign of the available power has a positive sign.

Referring to FIG. 17, in the second operation mode, the first switch 111 and the fifth switch 125 are conducting and the second switch 113, the third switch 121 and the fourth switch 123 are turned-off. The PMIC 100a connects energy harvester 10 and the rechargeable in series and provides the available power to the WSN 500 using the buck converter 130.

Figure 18:
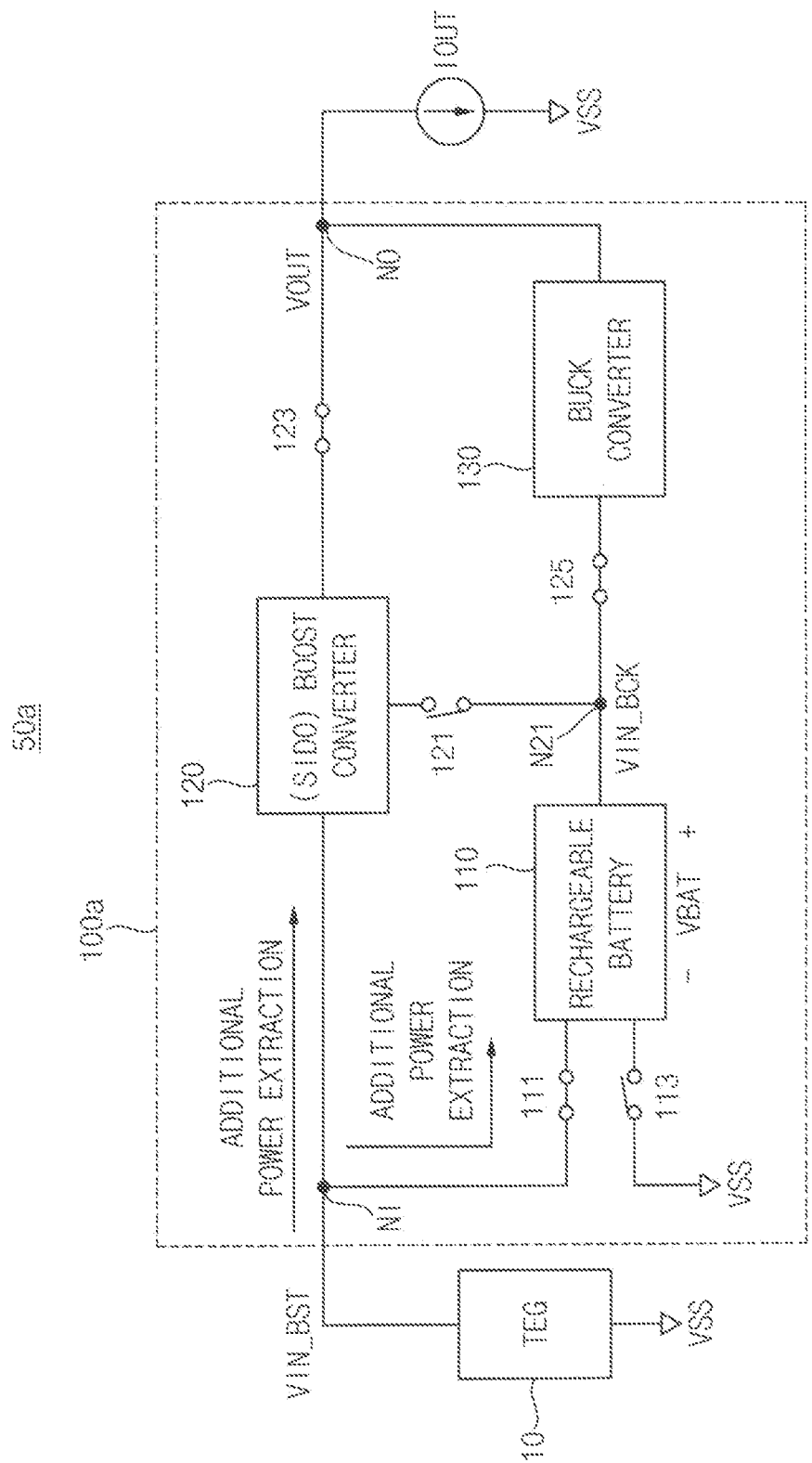
FIG. 18 illustrates the energy harvesting system of FIG. 14 in a third operation mode the power consumption consumed by the WSN is greater than the available power of the energy harvester and a sign of the available power has a positive sign.

FIG. 18 illustrates the energy harvesting system of FIG. 14 in a third operation mode the power consumption consumed by the WSN is greater than the available power of the energy harvester and a sign of the available power has a positive sign.

Referring to FIG. 18, in the third operation mode, the first switch 111, the fourth switch 123 and the fifth switch 125 are conducting and the second switch 113 and the third switch 121 are turned-off. The PMIC 100a provides the available power to the WSN 500 using the SIDO boost converter 120 and the buck converter 130 or the buck converter 130.

Figure 19:
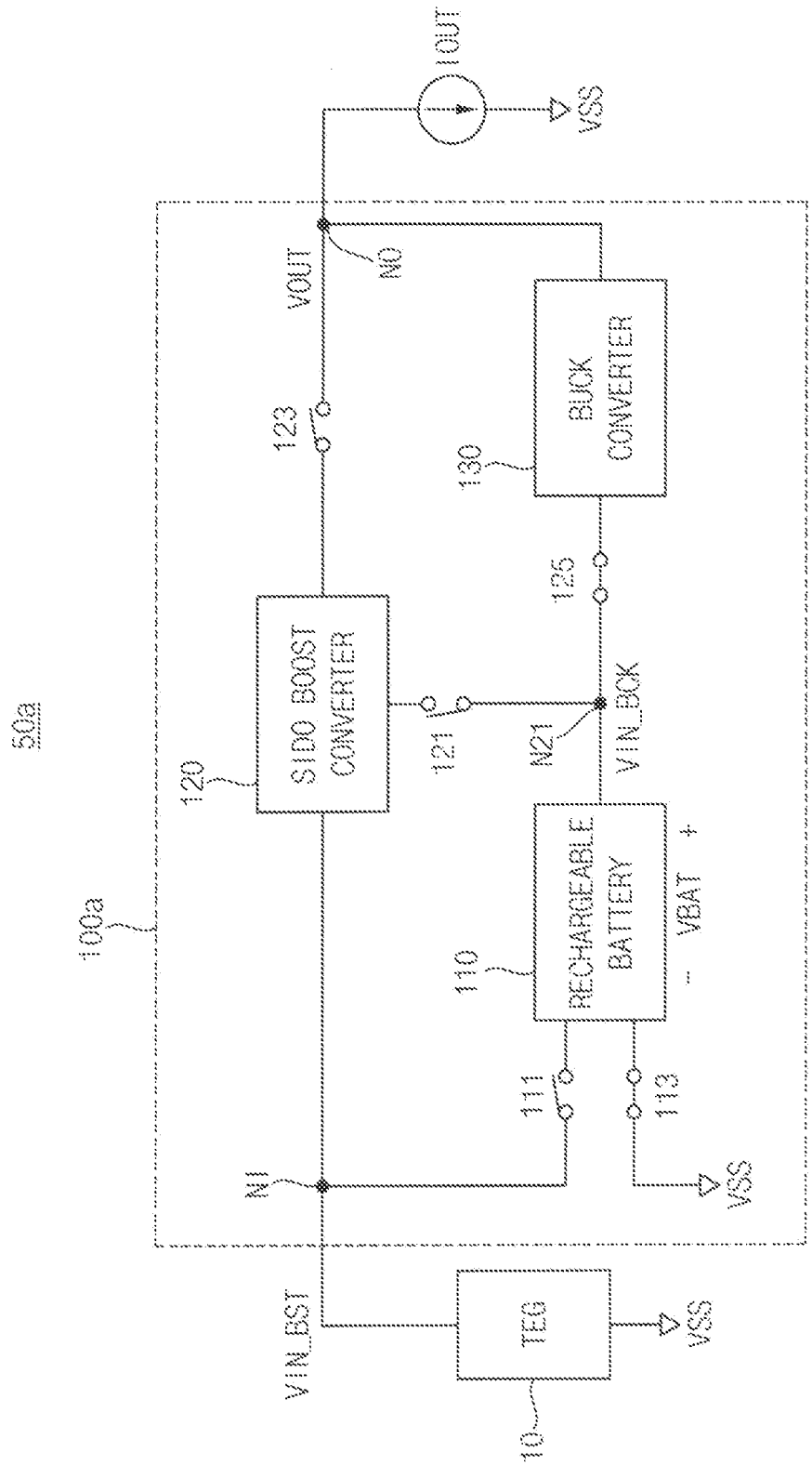
FIG. 19 illustrates the energy harvesting system of FIG. 14 in a fourth operation mode the power consumption consumed by the WSN is greater than the available power of the energy harvester and a sign of the available power has a negative sign.

FIG. 19 illustrates the energy harvesting system of FIG. 14 in a fourth operation mode the power consumption consumed by the WSN is greater than the available power of the energy harvester and a sign of the available power has a negative sign.

Referring to FIG. 19, in the fourth operation mode, the second switch 113 and the fifth switch 125 are conducting and the first switch 111, the third switch 121 and the fourth switch 123 are turned-off. The PMIC 100a drives the WSN 500 using the internal input voltage VIN_BCK and the buck converter 130.

As mentioned above, the PMIC for harvesting energy and the energy harvesting system, harvests energy using the thermoelectric device while the thermoelectric device generates energy and drives the wireless sensor node using the rechargeable battery while the thermoelectric device consumes energy. Therefore, the PMIC may reduce power consumption of the rechargeable battery and increase driving time of the wireless sensor node.

The present embodiments may be applied to any energy harvesting system and various power management integrated circuits used therein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A power management integrated circuit (PMIC) for harvesting energy, the PMIC comprising:
    a reconfigurable converter connected to a rechargeable battery and including an inductor to accumulate energy based on an input voltage applied to an input node from a thermoelectric device, the reconfigurable converter configured to provide a wireless sensor node connected to an output node with an output voltage based on the input voltage and an internal input voltage of the rechargeable battery, configured to operate in one of a plurality of operation modes based on an available power provided from the thermoelectric device and a power consumption by the wireless sensor node and configured to drive the wireless sensor node in response to the wireless sensor node consuming a current greater than a maximum current generated by the thermoelectric device; and
    a control circuit configured to apply a plurality of driving control signals and a plurality of switching control signals to the reconfigurable converter to control the reconfigurable converter based on the input voltage, a first voltage of a first switching node, a second voltage of a second switching node and the output voltage, the first switching node being connected to a first terminal of the inductor, the second switching node being connected to a second terminal of the inductor, and
    wherein:
    the reconfigurable converter is configured to harvest the energy from the thermoelectric device until the wireless sensor node consumes the maximum current,
    the control circuit is configured to generate the plurality of driving control signals and the plurality of switching control signals based on a comparison of the available power and the power consumption and based on a sign of the available power,
    the reconfigurable converter operates in a first operation mode of the plurality of operation modes in response to the wireless sensor node consuming a power smaller than the available power, and
    the reconfigurable converter operates in one of a second operation mode, a third operation mode and a fourth operation mode of the plurality of operation modes in response to the wireless sensor node consuming a power greater than the available power.

2. The PMIC of claim 1, wherein, in the first operation mode,
    the reconfigurable converter is configured to operate as a single-input dual-output (SIDO) boost converter which stores the input voltage in the inductor, provides the wireless sensor node with the available power based on the energy stored in the inductor and stores a surplus power not consumed by the wireless sensor node in the rechargeable battery, and
    the reconfigurable converter is configured to store the surplus power in the rechargeable battery based on a time-multiplexing under control of the control circuit.

3. The PMIC of claim 1, wherein, in the second operation mode in response the sign of the available power having a positive sign,
    the control circuit is configured to connect the thermoelectric device and the rechargeable battery in series such that the reconfigurable converter is configured to operate as a battery-thermoelectric device pile-up buck (BTPB) converter, and
    the reconfigurable converter is configured to regulate the output voltage based on the input voltage and the internal input voltage.

4. The PMIC of claim 1, wherein, in the third operation mode in response the sign of the available power having a positive sign,
    the control circuit is configured to connect the thermoelectric device and the rechargeable battery such that the reconfigurable converter is configured to operate as one of a battery-thermoelectric device pile-up buck (BTPB) converter and a dual-phase buck-boost (DPBB) converter that uses the BTBB converter and a buck-boost in combination.

5. The PMIC of claim 1, wherein, in the fourth operation mode in response the sign of the available power having a negative sign,
    the control circuit is configured to separate the thermoelectric device from the rechargeable battery such that the reconfigurable converter is configured to operate as a battery-supplied buck converter, and
    the reconfigurable converter is configured to regulate the output voltage based on the internal input voltage.

6. The PMIC of claim 1, wherein the reconfigurable converter includes:
    a first switching element connected between the input node and a first node coupled to a first end of the rechargeable battery, and receiving a first switching control signal of the plurality of switching control signals;
    a second switching element connected between the first node and a ground voltage, and receiving a second switching control signal of the plurality of switching control signals;
    a third switching element connected between the first switching node and a second end of the rechargeable battery, and receiving a third switching control signal of the plurality of switching control signals;
    a fourth switching element connected between the first switching node and the ground voltage, and receiving a fourth switching control signal of the plurality of switching control signals;
    the inductor coupled between the first switching node and the second switching node;
    a fifth switching element connected between the input node and the first switching node, and receiving a first driving control signal of the plurality of driving control signals;
    sixth switching elements connected in parallel between the second node and the second switching node, and receiving a second driving control signal of the plurality of driving control signals;

seventh switching elements connected in parallel between the second switching node and the ground voltage, and receiving a third driving control signal of the plurality of driving control signals; and eighth switching elements connected in parallel between the second switching node and the output, and receiving a fourth driving control signal of the plurality of driving control signals.

7. The PMIC of claim 6, wherein the control circuit is configured to generate the first through fourth switching control signals and the first through fourth switching driving signals such that:

the reconfigurable converter operates in the first operation mode in response to the wireless sensor node consuming the power smaller than the available power, and the reconfigurable converter operates in at least one of the second operation mode, the third operation mode and the fourth operation mode in response to the wireless sensor node consuming a power greater than the available power.

8. The PMIC of claim 7, wherein, in response to the first through fourth switching control signals and the first through fourth switching driving signals in the first operation mode, the first through fourth switching elements are turned-off, the fifth switching element and the eighth switching elements are conducting and the sixth switching elements and the seventh switching elements are turned-off such that the reconfigurable converter provides the wireless sensor node with the energy stored in the inductor based on the input voltage as the available power, and the second switching element, the fifth switching element, the sixth switching elements and the eighth switching elements are conducting, and the first switching element, the third switching element, the fourth switching element and the seventh switching elements are turned-off such that the reconfigurable converter stores a surplus power not consumed by the wireless sensor node in the rechargeable battery.

9. The PMIC of claim 7, wherein, in response to the first through fourth switching control signals and the first through fourth switching driving signals in the second operation mode in response the sign of the available power having a positive sign, the first switching element, the third switching element and the eighth switching elements are conducting and the second switching element, the fourth switching element, the fifth switching element, the sixth switching elements and the seventh switching elements are turned-off such that the thermoelectric device and the rechargeable battery are connected in series, and the reconfigurable converter provides the wireless sensor node with the energy stored in the inductor based on the input voltage and the internal input voltage as the available power.

10. The PMIC of claim 7, wherein, in response to the first through fourth switching control signals and the first through fourth switching driving signals in the third operation mode in response the sign of the available power having a positive sign, the first switching element, the third switching element and the eighth switching elements are conducting and the second switching element, the fourth switching element, the fifth switching element, the sixth switching element and the seventh switching elements are turned-off such that the thermoelectric device and the rechargeable battery are connected in series, and the reconfigurable converter provides the wireless sensor node with the energy stored in the inductor based on the input voltage and the internal input voltage as the available power or, the reconfigurable converter operates as a buck-boost converter and provides the wireless sensor node with the energy stored in the inductor as the available power.

11. The PMIC of claim 7, wherein, in response to the first through fourth switching control signals and the first through fourth switching driving signals in the fourth operation mode in response the sign of the available power having a negative sign, the second switching element, the third switching element and the eighth switching elements are conducting and the first switching element, the fourth switching element, the fifth switching element, the sixth switching elements and the seventh switching elements are turned-off such that the thermoelectric device is separated from the rechargeable battery, and the reconfigurable converter provides the wireless sensor node with the energy stored in the inductor based on the input voltage as the available power.

12. The PMIC of claim 1, wherein the control circuit includes:

a reference voltage generator configured to generate a first reference voltage, a second reference voltage, a first operating reference voltage and a second operating reference voltage;

a first controller configured to generate a first switching control signal and a second switching control signal of the plurality of switching control signals based on the input voltage, and configured to generate a third switching control signal and a fourth switching control signal of the plurality of switching control signals based on the first reference voltage, the second reference voltage, a filter voltage of a filter and the first voltage, wherein the filter is connected in parallel with the inductor between the first switching node and the second switching node; and a second controller configured to generate the plurality of driving control signals including first through fourth driving control signals based on the input voltage, the output voltage, the second voltage, the internal input voltage, the first operating reference voltage and the second operating reference voltage.

13. The PMIC of claim 12, wherein the first controller includes:

a Peltier effect preventer configured to generate the first switching control signal and a second switching control signal based on the sign of the input voltage;

a comparator configured to compare the filter voltage with the first reference voltage and the second reference voltage to generate a comparison signal;

a zero-current sensor configured to detect a zero value of an inductor current flowing through the inductor based on the first voltage to generate an internal signal; and a dead-time generator configured to generate the third switching control signal and the fourth switching control signal having a fixed dead time based on the comparison signal and the internal signal.

14. The PMIC of claim 12, wherein the second controller includes:

a maximum power transfer voltage tracking circuit configured to track a maximum power transfer voltage based on the input voltage when a maximum power is transferred to the wireless sensor node from the thermoelectric device;
an adaptive on-time voltage generator configured to generate on-time information associated with activation intervals of the first through fourth driving control signals based on the maximum power transfer voltage;
a zero-current sensor configured to detect a zero value of an inductor current flowing through the inductor based on the output voltage, the second voltage and the interval input voltage to generate an internal signal;
an off-time generator configured to generate off-time information associated with deactivation intervals of the first through fourth driving control signals based on the internal signal;
a switch size modulator configured to compare the input voltage with the first operating reference voltage and the second operating reference voltage to generate a first enable signal and a second enable signal which are associated with activation of sub driving signals of each of the first through fourth driving control signals; and
an adaptive dead-time generator configured to determine activation interval and deactivation interval of the first through fourth driving control signals based on the on-time information, the off-time information, a third enable signal and a fourth enable signal, and configured to determine a number of the sub driving signals, which are enabled, of each of the first through fourth driving control signals based on the first enable signal and the second enable signal,
wherein the third enable signal and the fourth enable signal designate a time-multiplexing associated with storing a surplus power not consumed by the wireless sensor node in the rechargeable battery.

15. An energy harvesting system comprising:
an energy harvester configured to harvest energy generated in an energy source to generate an input voltage;
a power management integrated circuit (PMIC) connected to a rechargeable battery, the PMIC configured to receive the input voltage through an input node, and including an inductor to accumulate energy based on the input voltage and the rechargeable battery, the PMIC configured to generate an output voltage based on the input voltage and selectively based on an internal input voltage of the rechargeable battery and further configured to provide the output voltage to an output node; and
a wireless sensor node connected to an output node, the wireless sensor node configured to operate based on the output voltage,
wherein the PMIC is configured to operate in one of a plurality of operation modes based on an available power provided from the energy harvester and a power consumption by the wireless sensor node and is configured to harvest the energy from the energy harvester to a maximum current generated by the energy harvester and configured to drive the wireless sensor node in response to the wireless sensor node consuming a current greater than a maximum current generated by the energy harvester,
wherein the wireless sensor node includes a transceiver configured to operate in a duty cycling mode, and the transceiver is connected to the PMIC when the transceiver transmits/receives data to/from an outside in the duty cycling mode,
wherein the PMIC includes:

a reconfigurable converter connected to the rechargeable battery and including the inductor, the reconfigurable converter configured to provide the wireless sensor node with the output voltage based on the input voltage and the internal input voltage of the rechargeable battery, configured to operate in one of the plurality of operation modes and configured to drive the wireless sensor node in response to the wireless sensor node consuming the current greater than the maximum current generated by the energy harvester; and
a control circuit configured to apply a plurality of driving control signals and a plurality of switching control signals to the reconfigurable converter to control the reconfigurable converter based on the input voltage, a first voltage of a first switching node, a second voltage of a second switching node and the output voltage, the first switching node being connected to a first terminal of the inductor, the second switching node being connected to a second terminal of the inductor, and
wherein:
the reconfigurable converter is configured to harvest the energy from the thermoelectric device until the wireless sensor node consumes the maximum current,
the control circuit is configured to generate the plurality of driving control signals and the plurality of switching control signals based on a comparison of the available power and the power consumption and based on a sign of the available power,
the reconfigurable converter operates in a first operation mode of the plurality of operation modes in response to the wireless sensor node consuming a power smaller than the available power, and
the reconfigurable converter operates in one of a second operation mode, a third operation mode and a fourth operation mode of the plurality of operation modes in response to the wireless sensor node consuming a power greater than the available power.

16. An energy harvesting system comprising:
an energy harvester configured to harvest energy generated in an energy source to generate an input voltage;
a power management integrated circuit (PMIC), the PMIC configured to receive the input voltage through an input node, and including an inductor to accumulate energy based on the input voltage, a rechargeable battery, a single-input dual-output (SIDO) boost converter and a buck converter that share the inductor, the PMIC configured to generate an output voltage based on the input voltage and selectively based on an internal input voltage of the rechargeable battery and further configured to provide the output voltage to an output node; and
a wireless sensor node connected to the output node, the wireless sensor node configured to operate based on the output voltage,
wherein the PMIC is configured to operate in one of a plurality of operation modes based on an available power provided from the energy harvester and a power consumption consumed by the wireless sensor node and is configured to harvest the energy from the energy harvester to a maximum current generated by the energy harvester, and
wherein the wireless sensor node includes a transceiver configured to operate in a duty cycling mode, and the transceiver is connected to the PMIC when the transceiver transmits/receives data to/from an outside in the duty cycling mode,
wherein the PMIC includes:

a reconfigurable converter connected to the rechargeable battery and including the inductor, the reconfigurable converter configured to provide the wireless sensor node with the output voltage based on the input voltage and the internal input voltage of the rechargeable battery, configured to operate in one of the plurality of operation modes and configured to drive the wireless sensor node in response to the wireless sensor node consuming the current greater than the maximum current generated by the energy harvester; and a control circuit configured to apply a plurality of driving control signals and a plurality of switching control signals to the reconfigurable converter to control the reconfigurable converter based on the input voltage, a first voltage of a first switching node, a second voltage of a second switching node and the output voltage, the first switching node being connected to a first terminal of the inductor, the second switching node being connected to a second terminal of the inductor, and wherein:

the reconfigurable converter is configured to harvest the energy from the thermoelectric device until the wireless sensor node consumes the maximum current, the control circuit is configured to generate the plurality of driving control signals and the plurality of switching control signals based on a comparison of the available power and the power consumption and based on a sign of the available power, the reconfigurable converter operates in a first operation mode of the plurality of operation modes in response to the wireless sensor node consuming a power smaller than the available power, and the reconfigurable converter operates in one of a second operation mode, a third operation mode and a fourth operation mode of the plurality of operation modes in response to the wireless sensor node consuming a power greater than the available power.

* * * * *